US007809360B2

(12) United States Patent
Agrawal et al.

(10) Patent No.: US 7,809,360 B2
(45) Date of Patent: Oct. 5, 2010

(54) OPTIMIZATION OF CALENDAR, ITINERARY, ROUTE PLAN, AND PIM EFFICIENCIES ACCORDING TO ASSIMILATED WIRELESS SERVICE AVAILABILITY CONDITIONS

(75) Inventors: Kavita Agrawal, Austin, TX (US); William K. Bodin, Austin, TX (US); Gregory W. Rybczynski, Pflugerville, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 11/425,404

(22) Filed: Jun. 21, 2006

(65) Prior Publication Data

US 2007/0275700 A1 Nov. 29, 2007

Related U.S. Application Data

(63) Continuation-in-part of application No. 11/420,021, filed on May 24, 2006, now abandoned.

(51) Int. Cl.
*H04Q 7/38* (2006.01)
(52) U.S. Cl. .................................... 455/414.1; 455/446
(58) Field of Classification Search ........................ None
See application file for complete search history.

(56) References Cited

U.S. PATENT DOCUMENTS

2005/0027442 A1 2/2005 Kelley et al.
2007/0050191 A1* 3/2007 Weider et al. ............... 704/275
2007/0135990 A1* 6/2007 Seymour et al. ............ 701/117
2007/0198432 A1 8/2007 Pitroda et al.

OTHER PUBLICATIONS

"Genetic Algorithm" from Wikipedia, the Free Encyclopedia, downloaded from http://en.wikipedia.org/wiki/Genetic_algorithm on Apr. 7, 2006.
"RouteMatch Software", downloaded on Apr. 7, 2006 from http://www.routematch.com/components.html.
"RouteMatch Software", downloaded on Apr. 7, 2006 from http://www.routematch.com/components.htm.
USPTO; Image File Wrapper Contents for U.S. Appl. No. 11/420,021, retrieved on Dec. 21, 2009, from http://www.uspto.gov.

* cited by examiner

*Primary Examiner*—Lester Kincaid
*Assistant Examiner*—Phuoc Doan
(74) *Attorney, Agent, or Firm*—Robert H. Frantz; Jill A. Poimbouef; Libby Z. Taub

(57) ABSTRACT

Real-time optimization of one or more events in an electronic agenda, an electronic itinerary, an electronic calendar, or an electronic route plan, by receiving an electronic personal plan for a first user having wireless connectivity service need indications during event(s) of the plan; receiving electronic reports from devices operated by users other than the first user indicating actual historical availability conditions of the required wireless connectivity at a location associated with the event of the plan; analyzing the electronic historical reports to find an alternate time, location, route, or combination of time, location, and route, for an event responsive to determining the needed wireless connectivity would not likely meet a service quality preference according to the historical availability; modifying the electronic personal plan to reflect the alternate finding to the first user; and transmitting a communique to said first user containing said alternate findings.

20 Claims, 26 Drawing Sheets

Fig. 5f

Bill's Calendar for: July 3, 2006

| Time | | Event |
|---|---|---|
| 8:00 am | | |
| 8:30 am | ? | |
| 9:00 am | 🏠 | Prepare for presentation @Desk |
| 9:30 am | 📱 | |
| 10:00 am | 📱 | |
| 10:30 am | 🏠 | |
| 11:00 am | 📱 | Lunch mtg – James K. @Chez Pierre |
| 11:30 am | 🏠 | |
| 12:00 pm | 📱 | |
| 12:30 pm | 📱 | |
| 1:00 pm | | |
| 1:30 pm | 📱 ? | Meet @Smith's Coffee House  ← 53a' |
| 2:00 pm | 🏠 | |
| 2:30 pm | 📱 ? | |
| 3:00 pm | 📱 | |
| 3:30 pm | | |
| 4:00 pm | 📱 🏠 | Review figures with sales team @ConfRm |
| 4:30 pm | | |
| 5:00 pm | | |

50f

Bill's Calendar for: July 3, 2006 53a"

| Time | Event |
|---|---|
| 8:00 am | |
| 8:30 am | Meet @Pancake Palace |
| 9:00 am | |
| 9:30 am | Prepare for presentation @Desk |
| 10:00 am | |
| 10:30 am | |
| 11:00 am | |
| 11:30 am | Lunch mtg - James K. @Chez Pierre |
| 12:00 pm | |
| 12:30 pm | |
| 1:00 pm | |
| 1:30 pm | |
| 2:00 pm | |
| 2:30 pm | |
| 3:00 pm | |
| 3:30 pm | |
| 4:00 pm | Review figures with sales team @ConfRm |
| 4:30 pm | |
| 5:00 pm | |

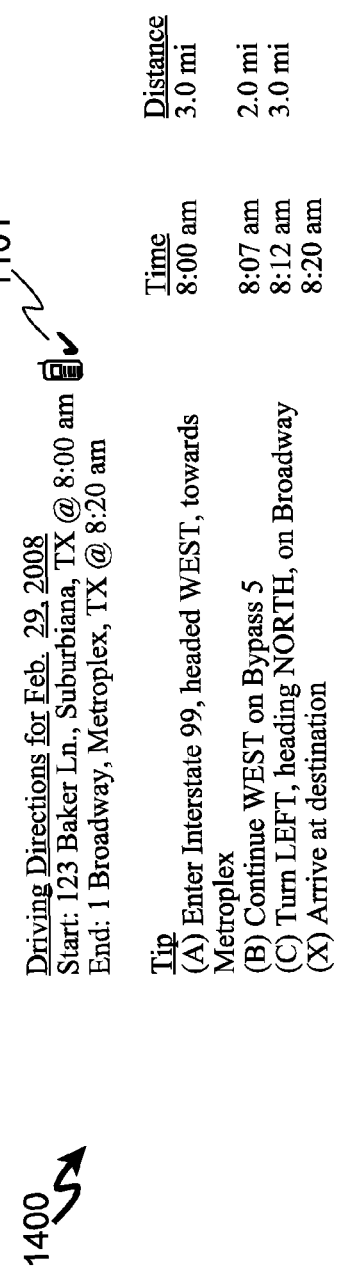

Driving Directions for Feb. 29, 2008
Start: 123 Baker Ln., Suburbiana, TX @ 8:00 am
End: 1 Broadway, Metroplex, TX @ 8:20 am

| Tip | Time | Distance |
|---|---|---|
| (A) Enter Interstate 99, headed WEST, towards Metroplex | 8:00 am | 3.0 mi |
| (B) Continue WEST on Bypass 5 | 8:07 am | 2.0 mi |
| (C) Turn LEFT, heading NORTH, on Broadway | 8:12 am | 3.0 mi |
| (X) Arrive at destination | 8:20 am | |

Fig. 14a

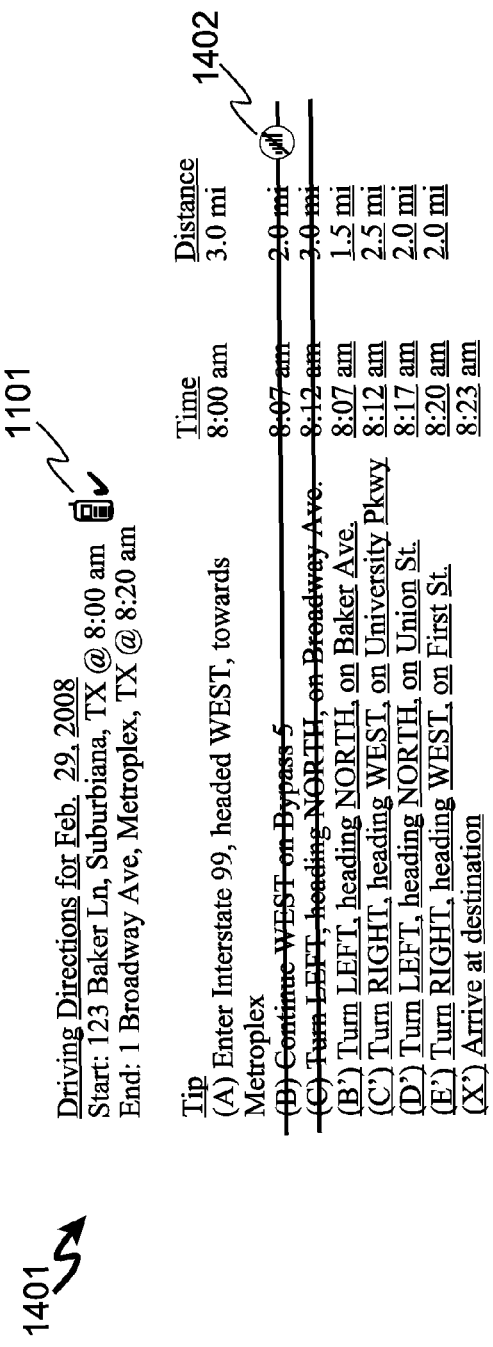

Driving Directions for Feb. 29, 2008
Start: 123 Baker Ln., Suburbiana, TX @ 8:00 am
End: 1 Broadway Ave, Metroplex, TX @ 8:20 am

| Tip | Time | Distance |
|---|---|---|
| (A) Enter Interstate 99, headed WEST, towards Metroplex | 8:00 am | 3.0 mi |
| (B) Continue WEST on Bypass 5 | 8:07 am | 2.0 mi |
| (C) Turn LEFT, heading NORTH, on Broadway Ave. | 8:12 am | 3.0 mi |
| (B') Turn RIGHT, heading NORTH, on Baker Ave. | 8:07 am | 1.5 mi |
| (C') Turn RIGHT, heading WEST, on University Pkwy | 8:12 am | 2.5 mi |
| (D') Turn LEFT, heading NORTH, on Union St. | 8:17 am | 2.0 mi |
| (E') Turn RIGHT, heading WEST, on First St. | 8:20 am | 2.0 mi |
| (X') Arrive at destination | 8:23 am | |

Fig. 14b

OPTIMIZATION OF CALENDAR, ITINERARY, ROUTE PLAN, AND PIM EFFICIENCIES ACCORDING TO ASSIMILATED WIRELESS SERVICE AVAILABILITY CONDITIONS

CROSS-REFERENCE TO RELATED APPLICATIONS (CLAIMING BENEFIT UNDER 35 U.S.C. 120)

This application is a continuation-in-part of U.S. patent application Ser. No. 11/420,021, filed May 24, 2006, filed by Kavita Agrawal, et al., and commonly assigned.

FEDERALLY SPONSORED RESEARCH AND DEVELOPMENT STATEMENT

This invention was not developed in conjunction with any Federally sponsored contract.

INCORPORATION BY REFERENCE

The related U.S. patent application Ser. No. 11/420,021, filed May 24, 2006, filed by Kavita Agrawal, et al, is hereby incorporated in its entirety.

MICROFICHE APPENDIX

Not applicable.

BACKGROUND OF THE INVENTION

1. Field of the Invention

This application is a continuation-in-part of U.S. patent application Ser. No. 11/420,021, filed May 24, 2006, filed by Kavita Agrawal, et al., and commonly assigned. This invention pertains to technologies for managing and optimizing an electronic itinerary, agenda, calendar, or other Personal Information Management resource to maximize wireless connectivity during designated priority periods.

2. Background of the Invention

Many people often use an electronic agenda, itinerary, route plan, or calendar to organize their daily activities. Products such as Lotus Organizer™, Microsoft Outlook™ provide such calendar and contact management functions for desktop and laptop computers. Portable devices such as personal information management ("PIM"), personal digital assistants ("PDA"), and wireless telephones also provide calendar and contact management functions. Bridges between the two are also common, such as Motorola MobilePhoneTools™, or Palm Desktop™, which synchronize calendar events and contact information between portable devices and stationary computers.

Route plans are often produced separate of an itinerary or calendar. Online services such as MapQuest™ and Yahoo! Maps™, global position system navigation systems such as devices offered by Garmin Corporation, and software products for personal computers and PDA's such as the Streets & Trips 2006™ product from Microsoft Corporation, are often used to develop an electronic route plan.

As people have become more and more reliant on their wireless telephone, these synchronization and integration functions have become increasingly popular. At certain times of a day, however, a user may have a critical need for wireless connectivity, such as a scheduled conference call during a time the user expects or plans to be away from his or her desk.

Additional wireless capabilities are also becoming critically important at certain times of a user's day. For example, if a user is expecting to need to work on a document over a wireless network at a time of a meeting with a client at the client's facilities, the user needs to have a reliable wireless connection during this period.

In this way, in the wireless space, as it relates to business travelers or consumers alike, there exists a need for robust or continuous wireless connectivity for voice and data communications, especially during certain periods of time or certain activities.

Typically, however, a person's work day may be roughly laid out by an electronic calendar, itinerary, route plan, or agenda, but the order or sequence of the activities is not planned or optimized based on wireless service availability during those times and at the locations of those activities.

Very primitive solutions to solve this problem have been attempted, such as users manually looking at a coverage map for a particular wireless service (e.g. voice service or wireless "hot spot" map) to determine if he or she will be able to access the wireless services they require at a certain time for a certain activity. This manual process is prone to error, as many users forget to do this before the activity starts, only to find at the last minute that connectivity is poor or nonexistent. Additionally, even for those who plan ahead, connectivity as shown on a static coverage map does not effectively indicate times of congestion, low signal strength, channel unavailability, etc.

Further, even after route plans, itineraries, and calendars have been manually optimized for connectivity during specific events or legs of a route, conditions may change in real-time, such as unexpected congestion of cell tower channels or unexpected outages of Wi-Fi service, during the execution of a calendar or plan.

BRIEF DESCRIPTION OF THE DRAWINGS

The following detailed description when taken in conjunction with the figures presented herein provide a complete disclosure of the invention.

FIGS. 5a through 5g illustrate various views of an example electronic calendar according to the invention.

FIG. 14*a* sets forth an example original route plan, and an updated route plan due to real-time signal availability changes.

FIG. 14*b* shows and example of canceled or changed segments (using strikeout text in this example), and showing alternative segments (using underlined text in this example).

SUMMARY OF THE INVENTION

Figure 1:
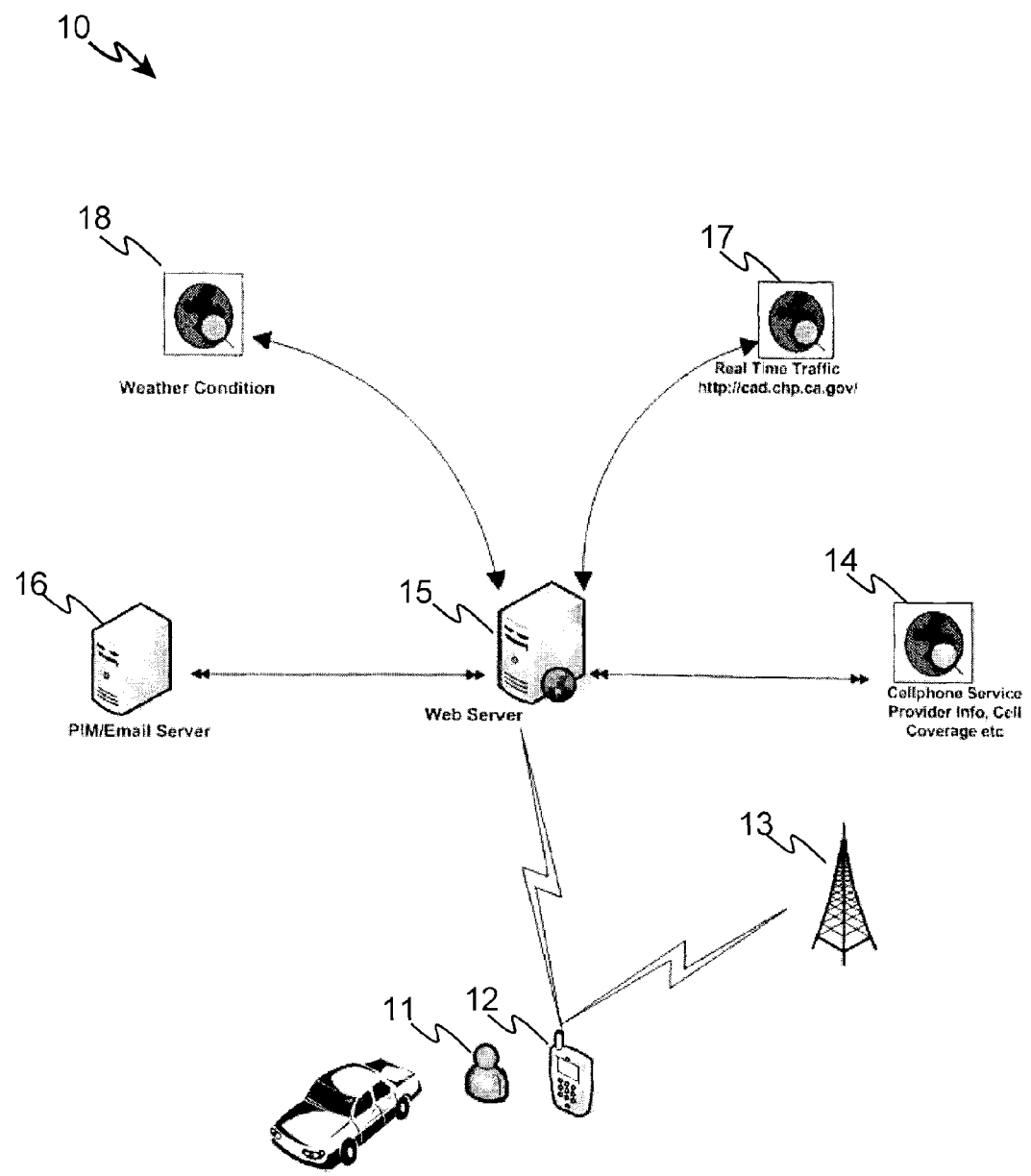
FIG. 1 depicts an arrangement of components, devices, networks, and systems according to the present invention.

Embodiments according to the invention automatically optimize, in real-time, one or more events in an electronic agenda, an electronic itinerary, an electronic calendar, or an electronic route plan, by receiving an electronic personal plan for a first user having wireless connectivity service need indications during event(s) of the plan; receiving electronic reports from devices operated by users other than the first user indicating actual historical availability conditions of the required wireless connectivity at a location associated with the event of the plan; analyzing the electronic historical reports to find an alternate time, location, route, or combination of time, location, and route, for an event responsive to determining the needed wireless connectivity would not likely meet a service quality preference according to the historical availability; modifying the electronic personal plan to reflect the alternate finding to the first user; and transmitting a communique to said first user containing said alternate findings.

DETAILED DESCRIPTION OF THE INVENTION

The inventors of the present invention have recognized a problem unaddressed in the art in that electronic calendars, agendas, and itineraries cannot be adequately organized and optimized in a wireless-dependent environment based solely on published, static service coverage maps which are generally based upon signal strength only, and do not take into account real-world factors such as congestion during certain times of day, weather interference, etc.

Also unlike others in the art, the inventors have further recognized, that availability of a wireless service is dependent on more than signal strength, but is also dependent on congestion of the service (e.g. channel availability, multiplexing load, etc.), weather conditions, driving traffic conditions, time of day, etc.

Further, the inventors have recognized, and others have not, that even well-planned calendars and route plans may not be sufficient, as real-time transient conditions in connectivity are not accommodated by fixed plans, routes, etc.

In developing the present and related inventions, the inventors have discovered that, unbeknownst to others in the art, adequate information is technologically available to perform automatic optimization of these schedules and route plans if certain information were systematically collected, updated, and assimilated, and if the information were then used to maximize service connectivity during designated priority usage activities and locations.

In these three ways, the inventors have recognized two problems previously unacknowledged by those in the art (e.g. inadequacy of printed coverage maps and additional reliability factors affecting service availability), and the inventors have discovered that adequate information can be mined from currently existing technology using additional practical methods and systems.

The invention, therefore, lies in part in these recognized problems, discovery of these principles, and in part in the designs of the solutions to systematically collect, update, and assimilate certain service availability information, followed by processes to optimize electronic calendars, agendas, and itineraries to maximize service connectivity during designated priority usage activities and locations.

The Related Invention

The present invention preferably, but not necessarily, utilizes and integrates to the invention set forth in the related patent application. It will be recognized by those skilled in the art that the present invention may be utilized or integrated with other technologies, as well. We therefore first review the details of the related invention for greater understandability, some of which are part of the preferred embodiment of the present invention.

The related invention addresses the previously described problem in a couple of ways. It provides a means for the assimilation of calendar data and location in establishing optimum route plans to address these connectivity issues. It further provides a means of deriving connection status information in order to correctly assemble accurate, realistic coverage maps for various wireless devices based on the location of these devices, signal strength, time of day, day of week, useful for automatically adjusting route plans or calendar activity orders appropriately.

Most existing solutions address connection management and PIM function without respect to the relationship between the two. But, our solution specifically addresses the need to plan and potentially reroute individuals based on the need for particular communications capabilities in light of the activity which needs to occur. Our solution provides for the aggregation of services and coverage metrics and assimilates these metrics with calendar, itinerary, agenda, route planning and other types of PIM functions.

According to one aspect of the invention, the invention implements web services, which can be thought of as plugin's to the system, which consider a plethora of inputs as master input to a route or daily calendar-based activity. The ultimate route plan or calendar output is now based on the options that are likely to be needed in each case. For instance, if a commuting traveler has a dependency on a broadband connection at a particular time of day, either indicated by existing calendar entries or dynamically dictated by evolving business needs, points of interest ("POI") from a database are considered in the scheduling process in order to provide the traveler with any particular services that may be needed. If that same traveler needs to be engaged in automobile travel in order to make it to a destination, and that traveler has a planned conference call which is bracketed by this transit, then the timing of the departure and arrivals are factored into the route planning to allow for the best possible reception and clarity for an in-transit cellular based call.

According to another aspect of the related invention, mobile devices are enabled or enhanced to allow real-time or deferred reporting of signal strength and service availability on these devices at times throughout the day, and at locations where the devices are positioned. This service availability log is then matched to location-based services of either tower signal strength or GPS origin.

This collected service availability information is then used in an iterative fashion to feed a server-side engine that makes determinations on the viability of a particular route, calendar event order, itinerary order, etc.

According to yet another aspect of the invention, the service availability information is optionally coupled to meteorological conditions, which can then be used to provide forecasting capabilities when the system derives a future route, or calendar, based on weather conditions.

Other aspects and embodiment variations will be apparent in the following paragraphs.

System Overview of the Related Invention. FIG. 1 illustrates a topology (10) of servers (15, 16); extrinsic data sources (14, 17, 18); one or more mobile wireless service devices (12) operated by one or more users (11); and one or more wireless service access points, towers, or antenna (13); interrelated according to the related invention. For the purposes of this disclosure, we will refer to electronic agenda, calendar, itinerary, and route planning systems as PIM servers, even though in some embodiments, these systems may or may not act as a server in a client-server arrangement. For example, one potential calendar program is Act!™ by Sage Software SB, Inc.

Annotation of Calendars, Agendas, Itineraries, and Route Plans. There exists a web services type interface on the planning server (16) that receives input from mobile device agents (11), weather agents (18), traffic agents (17), PIM servers (16), etc. The central web server (15) then provides either a derived calendar (formulating new calendar entries), or manipulates existing calendar entries in light of the input criteria.

Figure 5A:
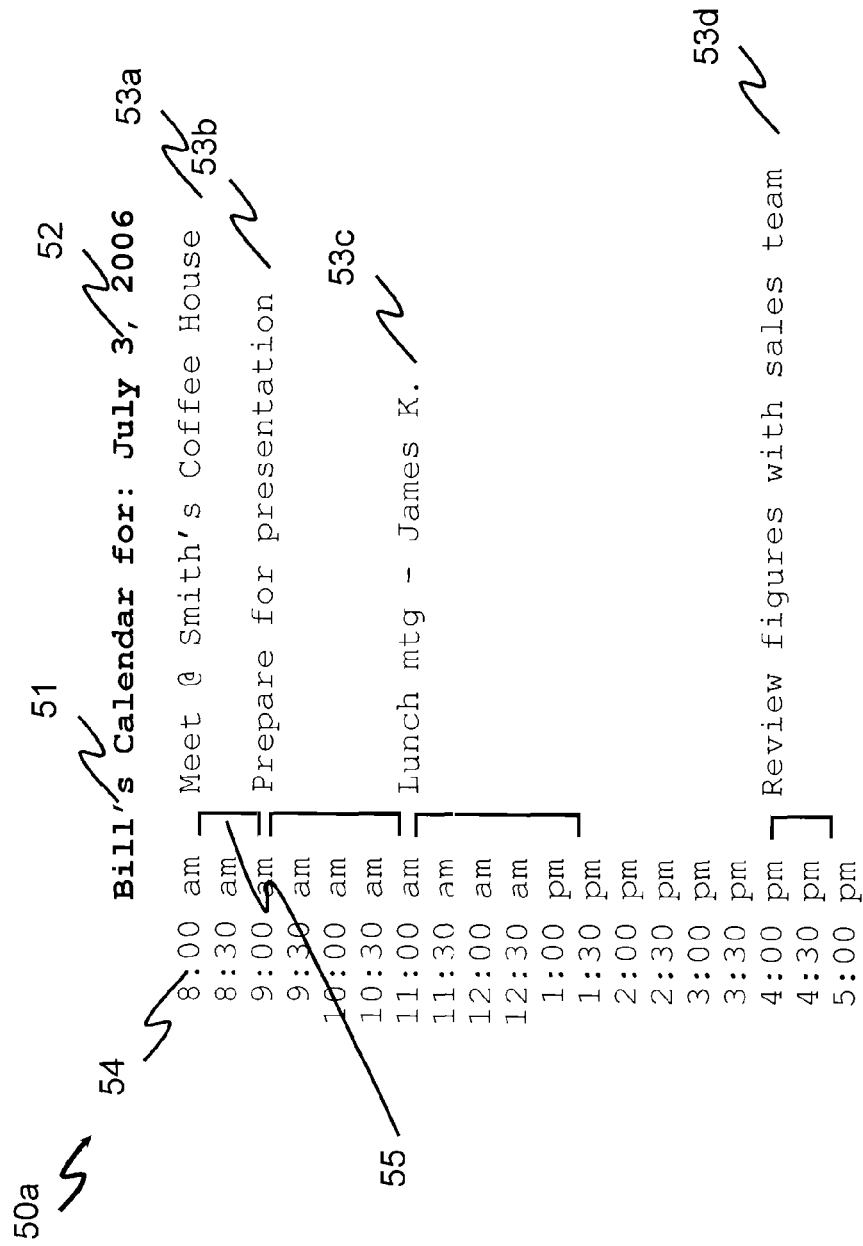

Electronic calendars, agendas, itineraries and route plans generally take the form of a displayed list, often arranged in chronological order, including times (e.g. start times, end times, depart times, arrive times, etc.) and descriptive entries (e.g. names of meetings, location indications, flight numbers, train numbers, etc.). FIG. 5a illustrates such a typical displayed agenda (50a), with an indication of the owner of the electronic document (51), the date (52) for which the events are being listed, various start or end times (54), and descriptive entries (53a, 53b, 53c, 53d). This information can often be transferred between software programs or devices in common formats, such as database files, markup language files, or in simple text files such as comma separate variable ("CSV") files. Table 1 illustrates a CSV example corresponding to FIG. 5a.

TABLE 1

Example CSV Agenda Data File

"Bill", 7/3/2006,8:00,9:00,"meet @ Smith's Coffee House<CR>
"Bill", 7/3/2006, 9:00, 11:00, "Prepare for presentation"<CR>
"Bill", 7/3/2006, 11:00, 13:30, Lunch mtg - James K. <CR>
"Bill", 7/3/2006, 16:00, 17:00, Review figures with sales team <CR>

Formatting of this type of raw schedule, route, or agenda information for display to a user is performed by a user interface program, device, or circuit, taking into account the capabilities of the display or printer (e.g. graphic or text-only, color or monochrome, size, resolution, etc.). For example, on one possible display, square bracket duration indicators (55) may be shown in order to assist the user in grasping the layout of his or her day's events.

Figure 5B:
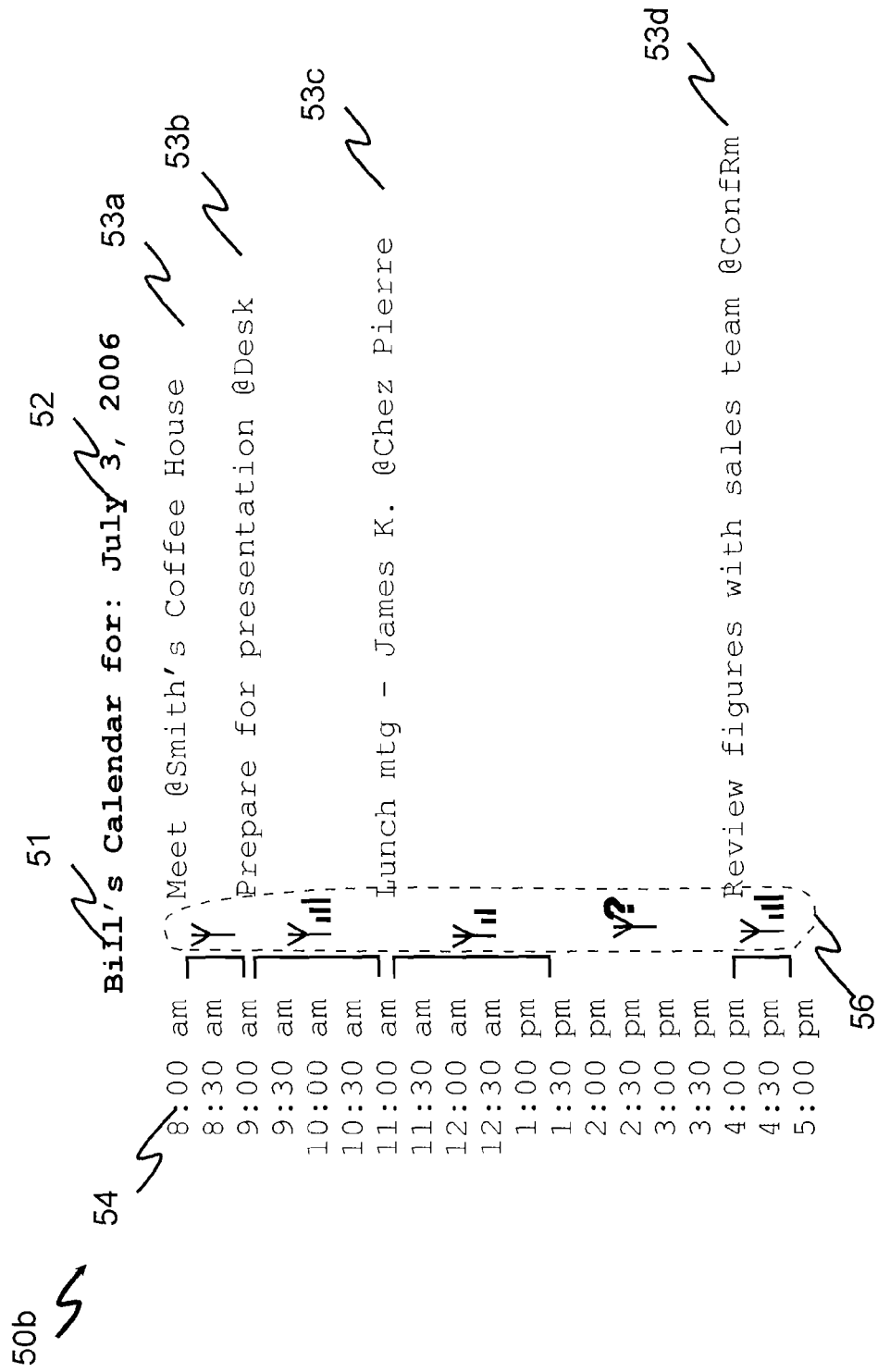

Turning to FIG. 5b, an annotated agenda according to the related invention is shown, in which a new indicator icon is displayed next to each entry indicating the general availability of wireless service based upon the time of the entry and the location. In this example, the location is keyed on the string following the "@" symbol, using a set of registered location names. In this example, the wireless antenna is shown with no bars to the right of it if no service is expected to be available at the location at that time. One or more bars next to the antenna indicates relative signal strength or service availability, while a question mark "?" indicates that service availability is unpredictable, or the location is unknown. Table 2 shows example CSV data for this annotated agenda.

TABLE 2

Example Annotated CSV Agenda Data File user="Bill"<CR>
date=7/3/2006 <CR>
8:00,9:00,"meet @ Smith's Coffee House,wireless=0<CR>
9:00, 11:00,"Prepare for presentation",wireless=3<CR>
11:00, 13:30, Lunch mtg - James K.,wireless=2<CR>
16:00, 17:00, Review figures with sales team, wireless=3<CR>

Figure 5C:
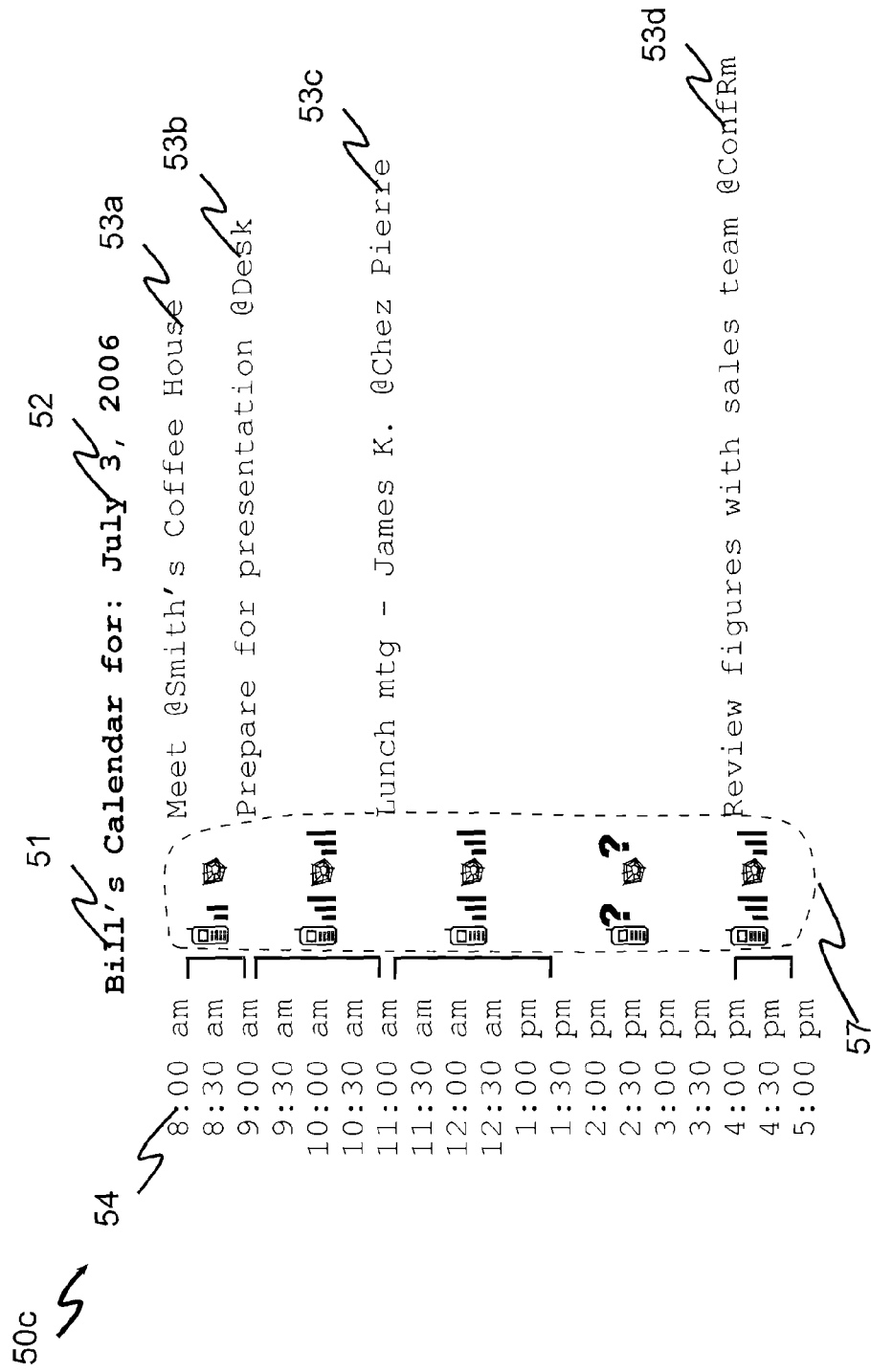

FIG. 5c illustrates yet another display according to the invention in which iconic indicators (57) are provided with information for wireless web access (e.g. a small spider web icon) and cellular phone service. For example, it is known that Smith's Coffee House does not usually have good access to the wireless web between 8:00 and 9:00 a.m., perhaps because of congestion within the hot spot, so the icon for this entry shows no bars. But, the cell phone service icon shows that cell phone service should be available at this time. Table 3 provides example CSV for this enhanced annotated agenda.

TABLE 3

Example Enhanced Annotated CSV Agenda Data File user="Bill"<CR>
date=7/3/2006 <CR>
8:00,9:00,"meet @ Smith's Coffee House,cell=2, wifi=0<CR>
9:00, 11:00,"Prepare for presentation", cell=3, wifi=3<CR>
11:00, 13:30, Lunch mtg - James K.,cell=3, wifi=3<CR>
16:00, 17:00, Review figures with sales team, cell=3, wifi=3<CR>

Figure 5D:
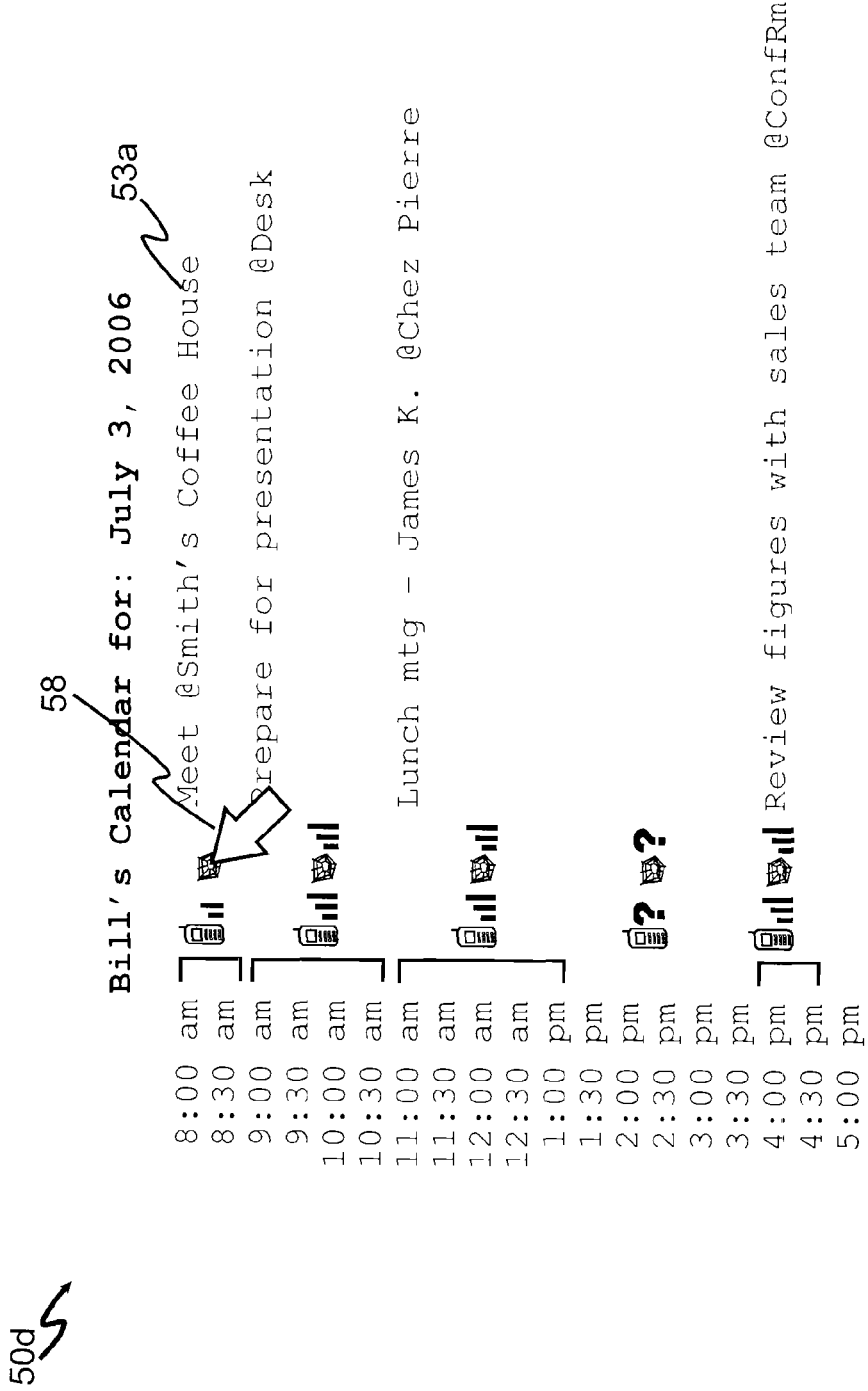
Figure 5E:
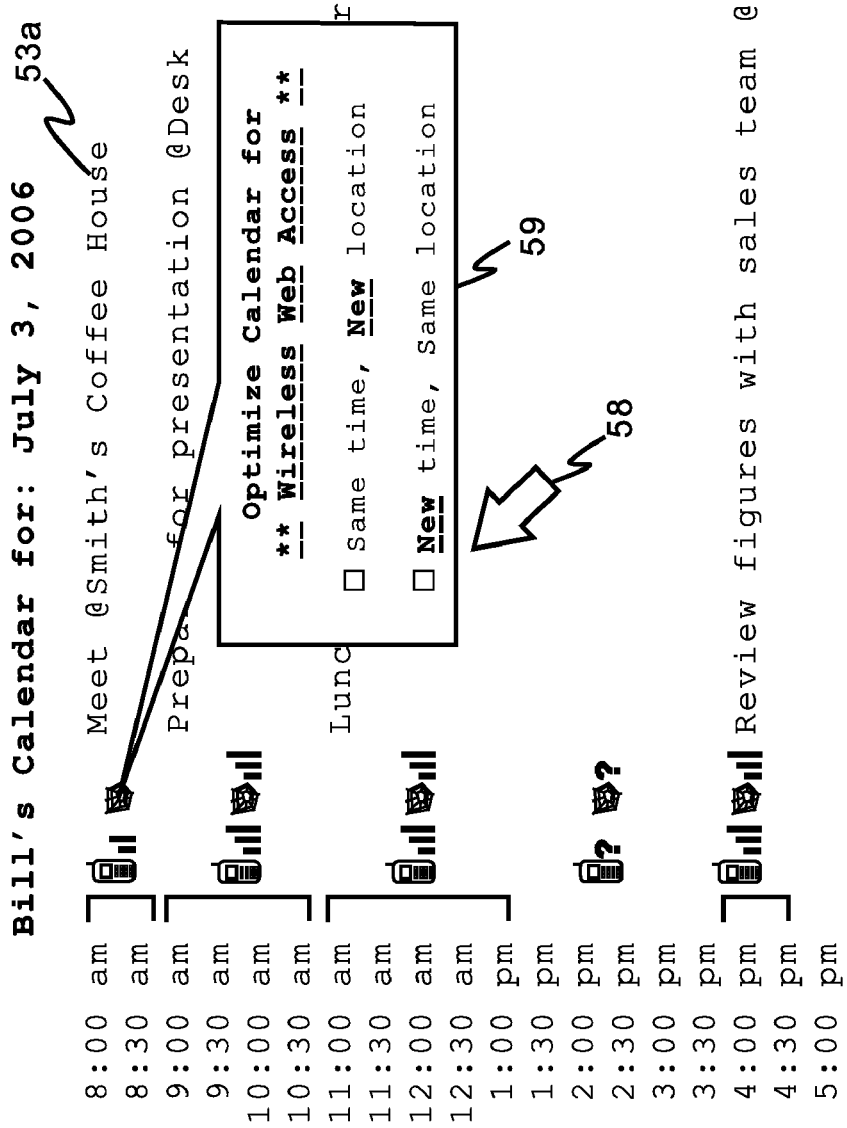

Example User Interface Operation of the Related Invention. In FIG. 5d, an example operation of the user interface to control the invention is shown, in which a cursor or pointer (58) is placed over a service indicator icon, and the icon is selected (e.g. tapped, double clicked, etc.). This, in one embodiment, results in the appearance of a pop up dialog (FIG. 5e, #59), which allows the user to optimize the entry for wireless web service by selecting another time or another place.

FIG. 5f shows an example of a modified annotated agenda resulting from the invention's finding a time when wireless web service is historically known to be good, reliable or strong at Smith's Coffee House (53a'). Table 4 shows example CSV agenda data corresponding to this modified agenda.

TABLE 4

Example Modified Enhanced Annotated CSV Agenda Data File user="Bill"<CR>
date=7/3/2006 <CR>
9:00, 11:00,"Prepare for presentation", cell=3, wifi=3<CR>
11:00, 13:30, Lunch mtg - James K.,cell=3, wifi=3<CR>
13:30,14:30,"meet @ Smith's Coffee House,cell=2, wifi=2<CR>
16:00, 17:00, Review figures with sales team, cell=3, wifi=3<CR>

Figure 5G:

Alternatively, if the user selected optimization for wireless web service access for the same time, allowing the invention to select an alternate place (e.g. the meeting time is more important than the place), then the invention would search the wireless web availability data for that time frame, and would modify the agenda to show a different location (53a") as shown in FIG. 5g (e.g. moving the location to "Pancake Palace"). Table 5 illustrates CSV agenda data for this example modification.

TABLE 5

Example Modified Enhanced Annotated CSV Agenda Data File user="Bill"<CR>
date=7/3/2006 <CR>
8:00,9:00,"meet @Pancake Palace,cell=2, wifi=0<CR>
9:00, 11:00,"Prepare for presentation", cell=3, wifi=3<CR>
11:00, 13:30, Lunch mtg - James K.,cell=3, wifi=3<CR>
16:00, 17:00, Review figures with sales team, cell=3, wifi=3<CR>

Figure 6:
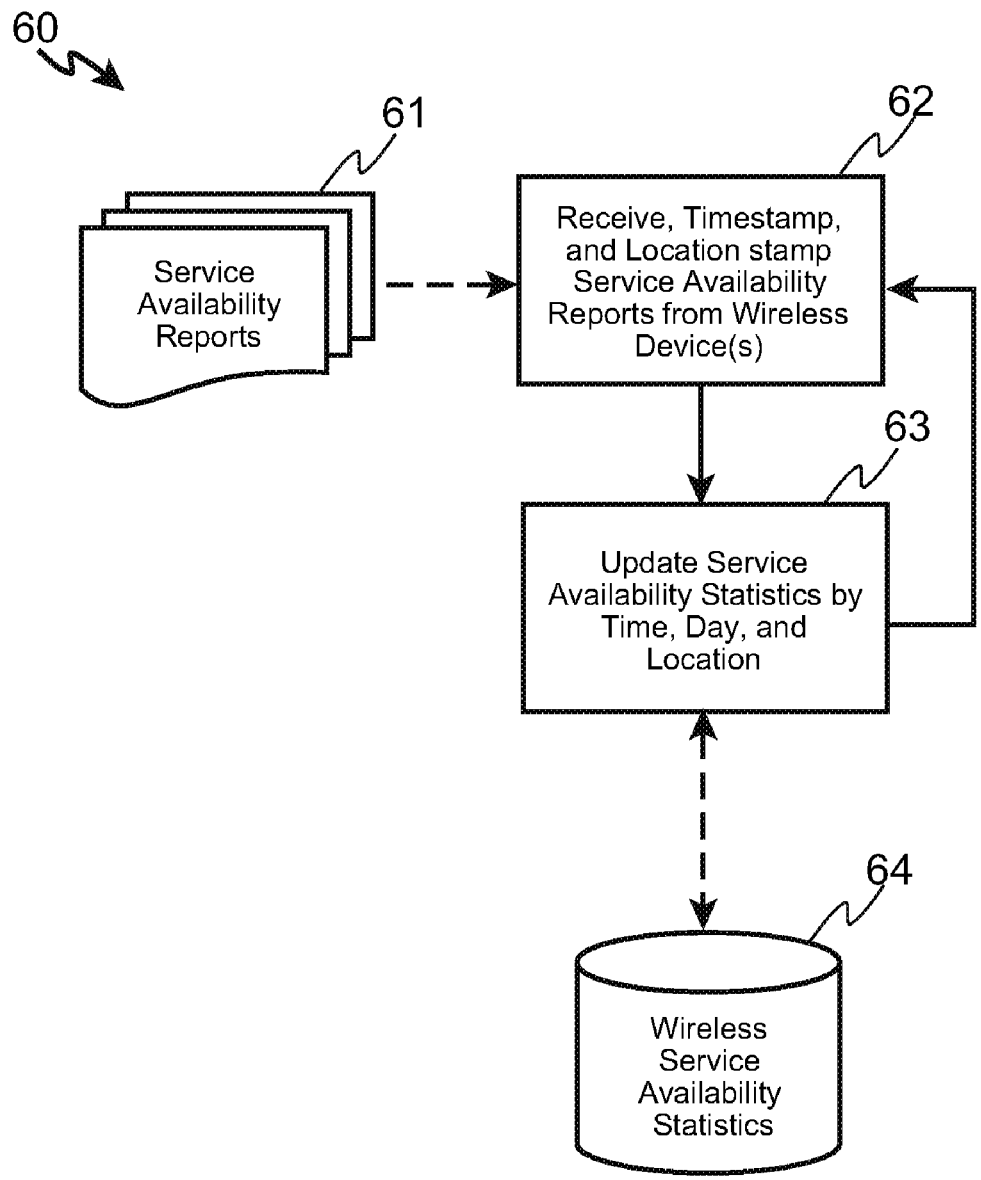
FIG. 6 sets forth a logical process according to the invention for collecting wireless availability statistics.

Logical Processes of the Invention. Turning now to FIG. 6, a logical process (60) according to the invention for collecting and updating statistical data regarding wireless service available during periods of the day, days of the week, and at recorded locations, is shown.

A number of service availability reports (61) are collected from a plethora of wireless devices. For example, a number of cell phones may be fitted with an agent process which reports availability of wireless service, which can be correlated to location (e.g. from the phone's E911 locator or from the cell phone tower closest to the phone), and timestamped with time, day and date. Information such as signal strength, channel availability, audio clarity, etc., can be collected.

Similarly, PDA's and laptop computers can be equipped with agent processes to report wireless fidelity ("Wi-Fi") service availability. For example, Wi-Fi signal strength, data throughput rates, and service quality of service (e.g. packet resend statistics) can be reported and collected. Time, day, and datestamps are added to the reported information.

The information is stored in a wireless service availability statistics database (64), and is periodically updated or updated as data becomes available.

In this manner, a database of information regarding wireless service availability based upon real, extrinsic device experiences is accumulated for use in the invention.

Figure 7:
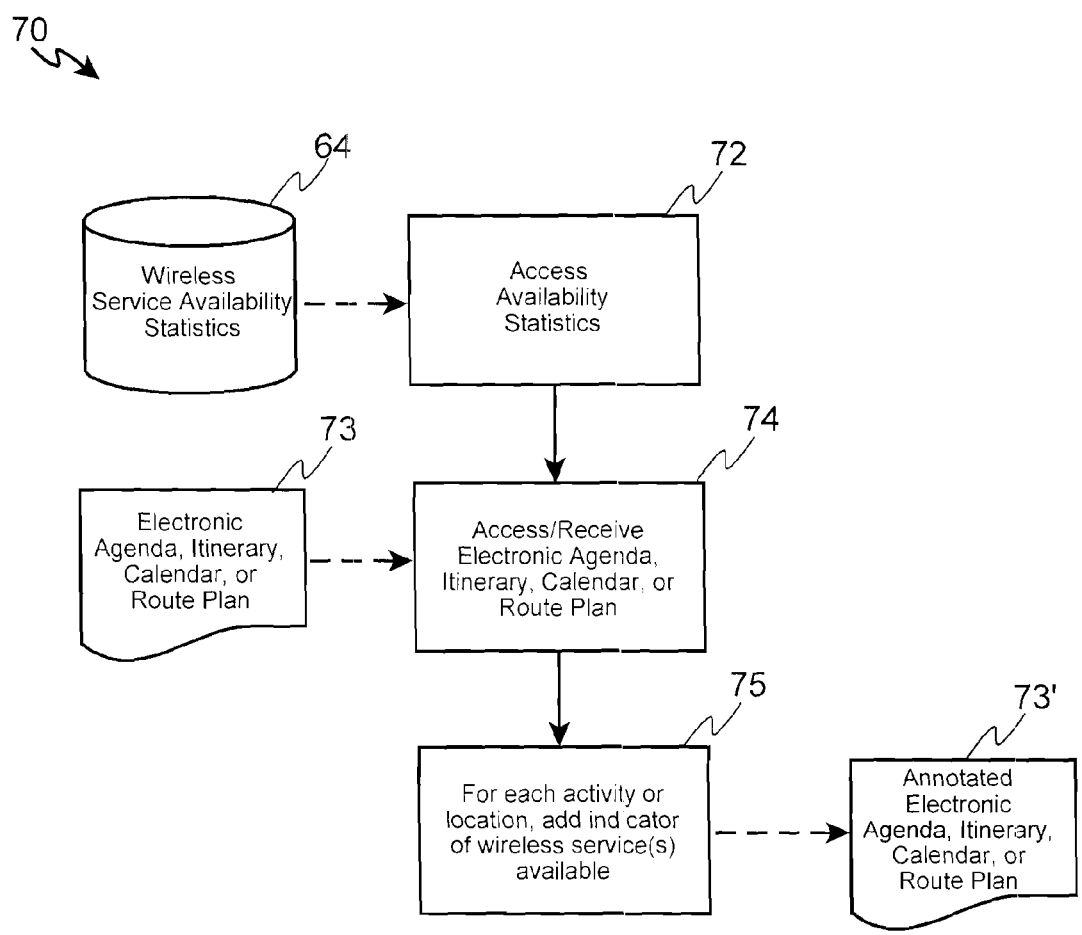
FIG. 7 sets forth a logical process according to the invention for annotating an electronic calendar, itinerary, agenda, or route plan to indicate wireless service availability for events in the plan.

FIG. 7 provides an example logical process (70) according to the invention for annotating an electronic agenda, itinerary, calendar or route plan to indicator wireless service availability for each entry in the electronic agenda, itinerary, calendar or route plan. The wireless service availability statistics (64) are accessed (72), and the electronic agenda, itinerary, calendar or route plan (73) for the user is retrieved (74), such as a CSV data file. Based on the data (64), the appropriate icons are added to the display, and the underlying data for the agenda is modified appropriately (75, to produce an annotated electronic agenda, itinerary, calendar or route plan (73').

Figure 8:
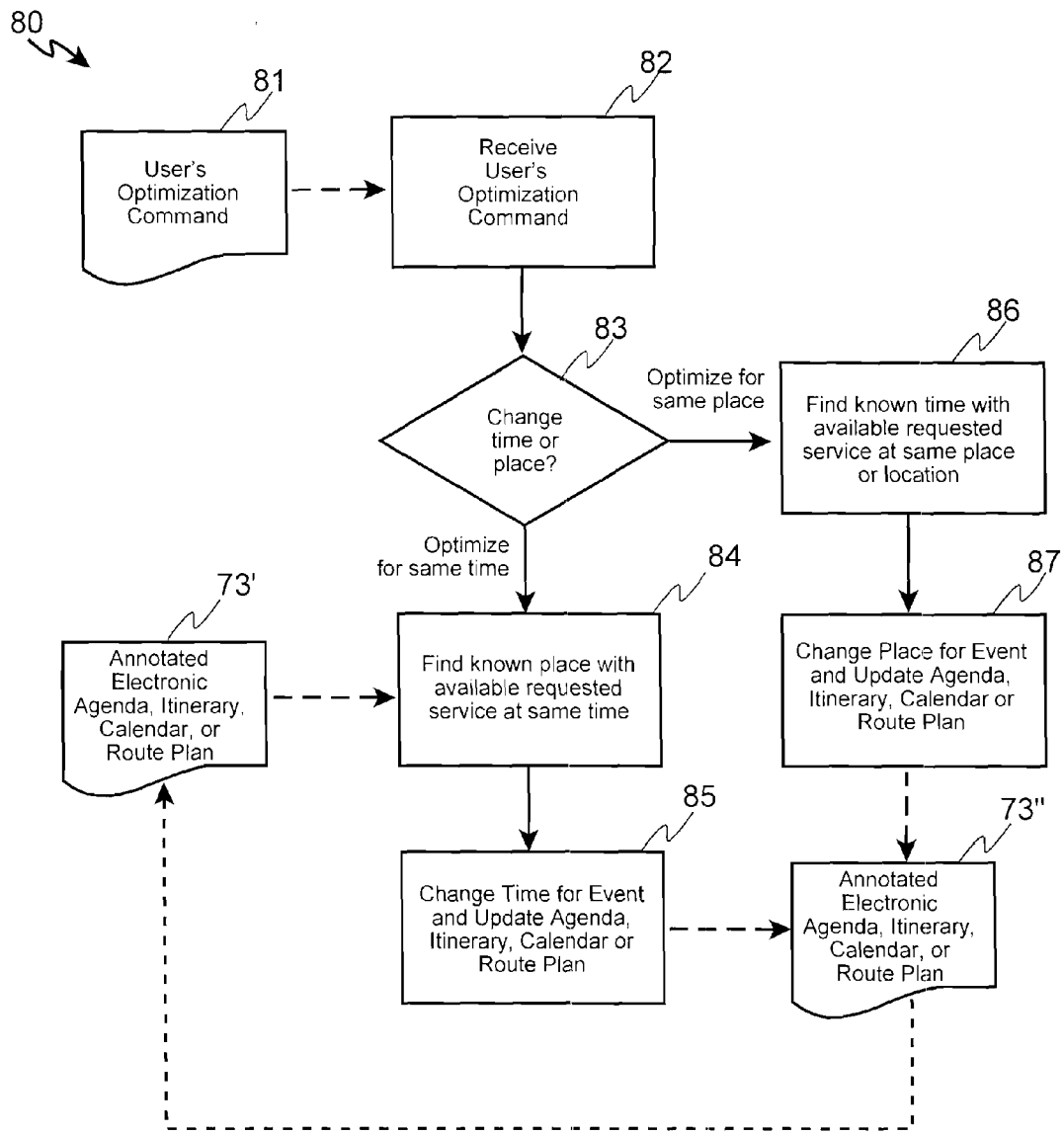
FIG. 8 sets forth a logical process according to the invention for modifying an electronic calendar, itinerary, agenda, or route plan to allow a higher expectation of wireless service availability for an event in the plan.

FIG. 8 shows a logical process (80) according to the related invention for modifying an annotated electronic agenda, itinerary, calendar or route plan (73') responsive (82) to a user's command (81) to find a time or location (83) during which a selected wireless service is expected to be available or reliable. If the user has selected to allow the time to be modified by the system, the service availability data is searched (86) to find a time at which the service is better or more reliable, and the agenda data is updated (87) to reflect the optimization. Likewise, if the user has selected to allow the location to be modified by the system, the service availability data is searched (84) to find a location during which the service is better or more reliable, and the agenda data is updated (85) to reflect the optimization.

The resulting modified, annotated electronic agenda, itinerary, calendar or route plan (73") is saved, and the user interface is updated to show the optimized electronic agenda, itinerary, calendar or route plan.

Figure 9:
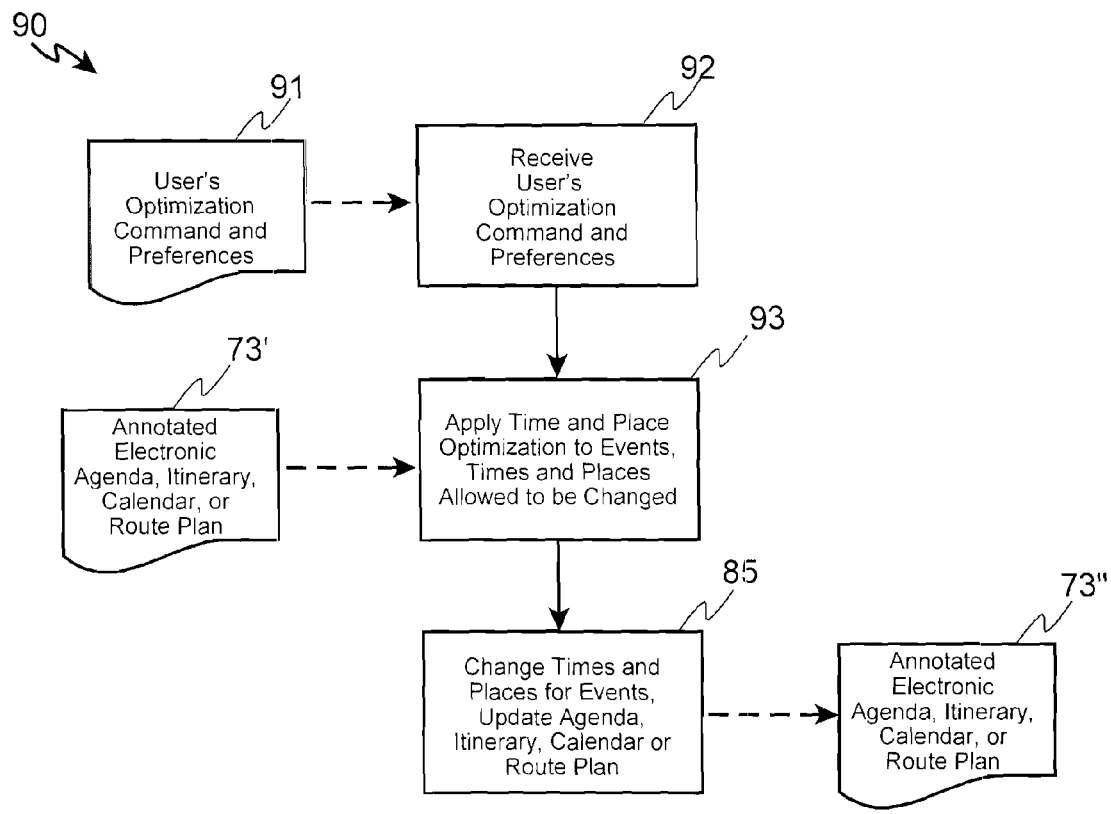
FIG. 9 sets forth a logical process according to the invention for modifying an electronic calendar, itinerary, agenda, or route plan to allow a higher expectation of wireless service availability for multiple events in the plan.

Finally, in FIG. 9, a logical process (90) according to the invention for optimizing an entire electronic agenda, itinerary, calendar or route plan (73') (e.g. optimizing all events, times, locations, and entries is shown. A set of user's preferences (91) is accessed (92), and a optimization process (93), such as a genetic algorithm-based process for route, schedule, and plan optimization, is applied to all events, times, and locations. Event times and locations are modified (95), and the resulting modified electronic agenda, itinerary, calendar or route plan (73") is saved and displayed.

Figure 10:
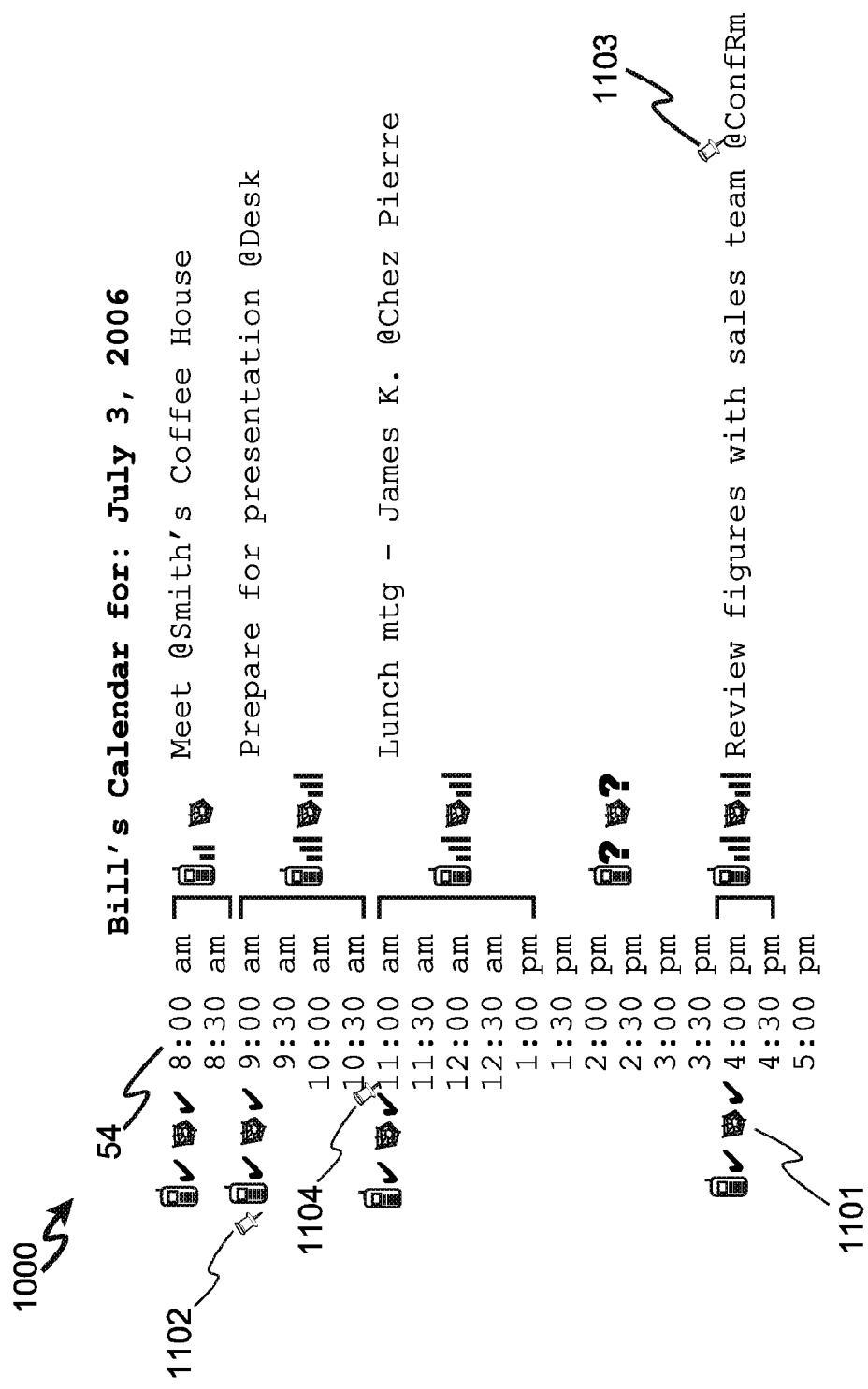
FIG. 10 illustrates an enhanced user display according to the present invention which provides user-selectable icons to control optimization of the plan.

FIG. 10 shows a user interface example including icons which are controllable by a user for setting such preferences (91). In this example, cell phone access optimization icons and wireless web access icons (1101) show checkmarks next to them if the user wishes the invention to optimize the data for cell, wireless, or both, services. A push-pin icon can be located on the time (1104), the location (1103), or the entire event (1102), for the user to indicate that the invention is not to change the time, place, or both, of an event. These icons could be operated in a toggle method (click on, click off), drag-and-drop method, or other useful method. Alternate user interface methods are readily available for setting the user preferences, of course.

Real-Time Calendar, Route Plan, or Itinerary Optimization for Connectivity

Once an initial electronic calendar, itinerary, or route plan has been established including designations of needed wireless service connectivity during specific routes, segments (e.g. "legs") of routes, events, or periods of the calendar, itinerary, or route plan, the present invention provides for real-time updates to the calendar, itinerary, or route plan using collected signal or service availability from other users in the areas where the current user will be in the future.

Figure 13:
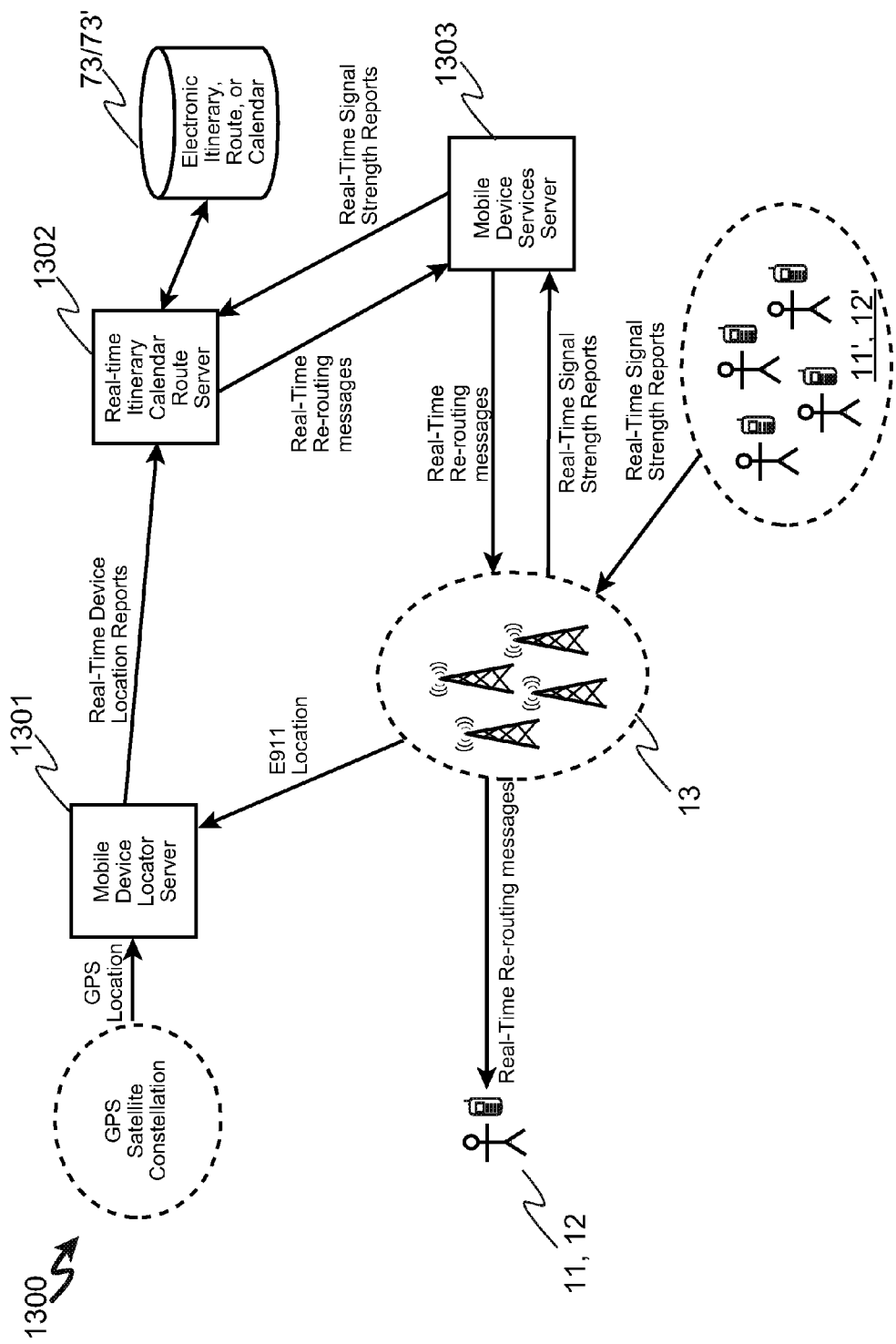
FIG. 13 shows a system arrangement according to the present invention in which real-time signal strength information is utilized to update an electronic calendar, itinerary, route plan, etc., to maintain required connectivity during designated events, trip legs, etc.

Turning to FIG. 13, a system arrangement (1300) according to the invention is shown, in which the connectivity-optimized and/or annotated (73, 73') calendar, itinerary, or route plan for a first user (11) of a wireless service device (12)

is stored and accessible by a real-time optimization server (1302). During execution of the plan or calendar, there are likely a number of users (11', 12') of a similar or the same needed service(s) in the locations where the first user (11) will be at some point during the plan, route, or calendar.

These other users of other devices (11', 12') then are used to collect, in real-time, the actual signal strength or other service availability reports (e.g. actual data throughput, channel availability, etc.) through a system of wireless service access points (13) (e.g. cell phone towers, Wi-Fi service access points, etc.), via one or more mobile device services servers (1303), such as a wireless web server or a cell phone service provider. These real-time service availability reports are provided to the real-time optimization server (1302).

Additionally, during execution of the route plan, itinerary, or calendar, the location of the first user and his or her device (11, 12) is continuously ascertained using one or more conventional means, such as the E911 location process or through a Global Positioning System ("GPS"). This real-time location of the first user and device is relayed from the location server (1301) to the real-time optimization server (1302).

Using this real-time information regarding the actual location of the user, the actual service availability in the areas where the user is going to be, and by continuously or periodically comparing the service requirement designations of the user's electronic itinerary, route plan, or calendar (73, 73'), the optimization server (1302) detects, in advance, potential problems of lack of service when needed.

The optimization server, then, performs re-routing or re-planning, preferably as previously described in the related invention description, and preferably using any available real-time service availability reports for alternative times, locations, trip segments, etc.

Using the alternate times, locations, trip segments, etc., the user's electronic itinerary, route plan, or calendar (73, 73') is updated in real-time, and the user is notified via one or more mobile services servers (1303). Notifications can take many forms, such as a cell phone call with voice announcement (e.g. "Please note that cell phone service may not be available along Interstate 99 ahead—please take alternative route on Baker Avenue"), with a text message (e.g. email, instant message, On-Star message, etc.), or even through changes to an in-vehicle navigation system's directions to a driver.

Figure 11:
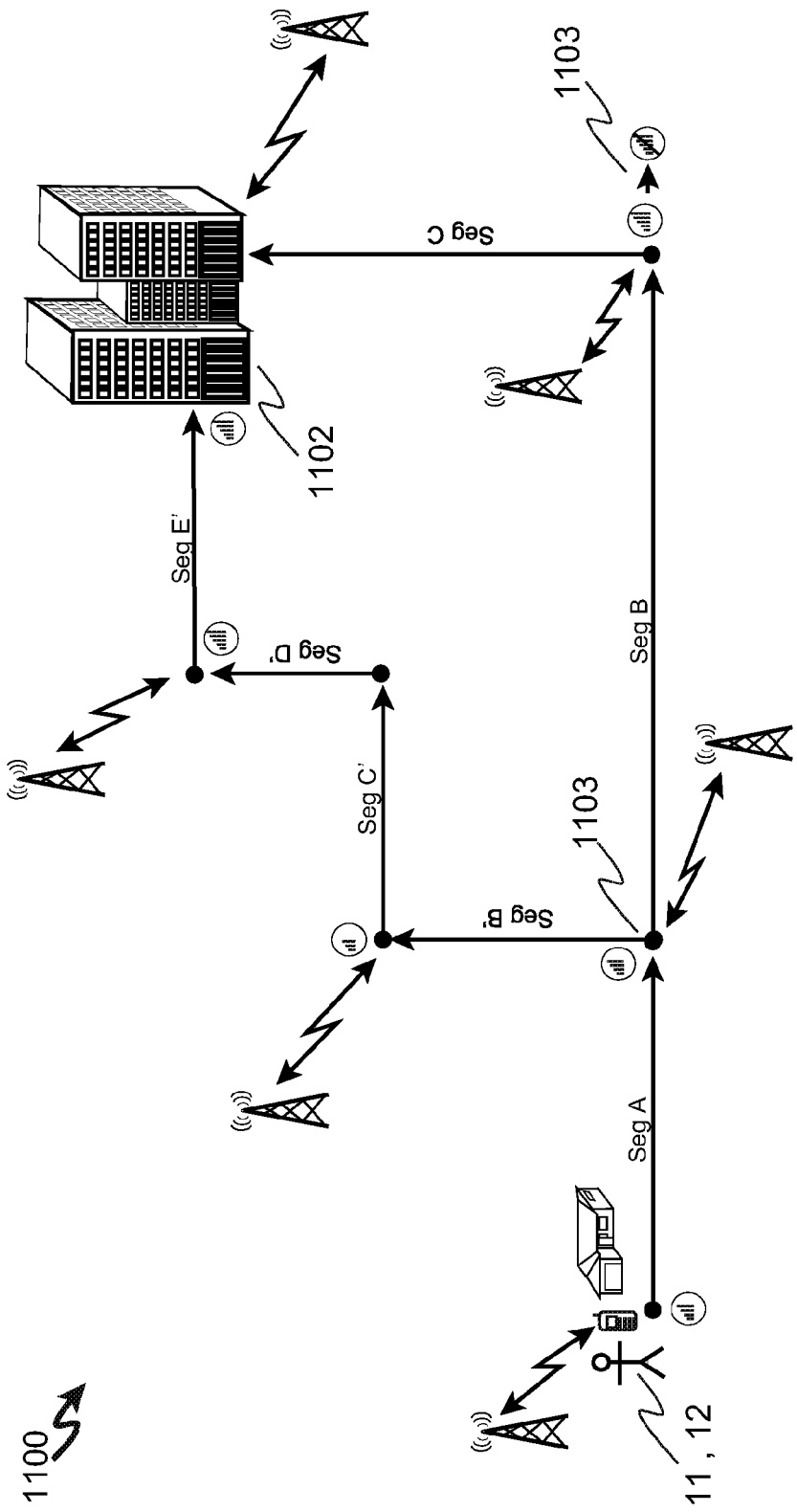
FIG. 11 provides an example of a routing plan which is re-routed during execution due to a real-time change in needed connectivity.

For example, consider a hypothetical trip as illustrated in FIG. 11, where the user (11) with a wireless phone (12) plans to travel from his or her house to a downtown location (1102) during a certain time period, such as beginning at 8:00 am on Feb. 29, 2008. FIG. 14a illustrates a typical route plan having three segments (A, B, C), in which the user has designated (1101) a requirement to have cell phone access during the entire trip on all segments.

However, during travel on segment A (e.g. along Interstate 99), and before starting segment B (1103), the invention determines from real-time collected service availability reports that service may not be available during segment B or segment C (1103). For example, other users' devices on either of these segments may be reporting channel unavailability, low signal strength, or a high number of dropped calls due to incomplete hand-offs between towers.

The invention, then, determines an alternative route starting at the beginning (1103) of original segment B (or alternatively during a point within segment B), such as route B'-C'-D'-E', as shown in FIG. 11. Using these updated route segments, the user's electronic itinerary, route plan, or calendar (73, 73') is updated and communicated in real-time to the user, such as transmitting the annotated route plan of FIG. 14b showing canceled or changed segments (using strikeout text in this example), and showing alternative segments (using underlined text in this example). Additionally, according to a preferred embodiment, an icon (1402) or other indicator is used to signal the user why the plan is being changed. This updated plan may be transmitted in full form using email or text messaging, or may be transmitted in partial form, such as by transmitting only the changed items.

Enhanced Annotated Service Availability Maps

Using the methods and components of the present invention, wireless service providers may produce better, more accurate service availability maps. Whereas currently used "coverage" maps often are simply annotated to show where coverage should be available due to tower placement, geographical interference, etc., the enhanced maps produced by the invention can show where service is actually available, either historically or in real-time.

Figure 12:
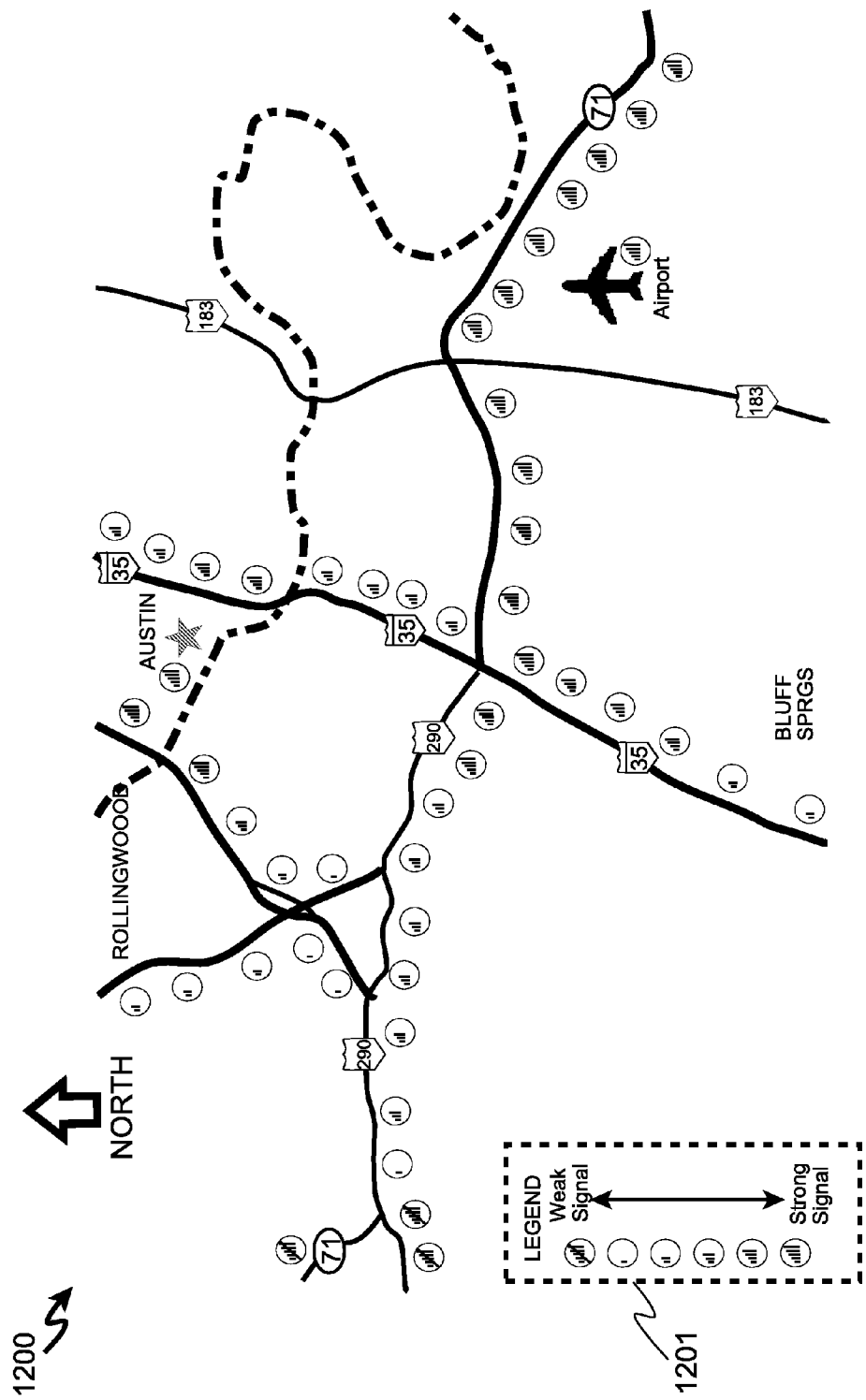
FIG. 12 illustrates an annotated map example in which major routes or areas of a map are provided with signal strength indicators, not just coverage.

Using the real-time service reports collected by the invention, a map such as the map of the Austin, Tex., vicinity shown in FIG. 12, may be annotated by icons (1201) as to actual service availability, signal strength, channel congestion, data throughput, etc.

This map may be averaged over a historical set of reports, such as a map showing actual service availability conditions for Monday through Friday during morning rush hour, 7:00 am to 9:00 am, over the last 30 days. Such a map can be distributed through traditional printing means, or through electronic means such as offering the map online via a map resource web site or through a wireless service provider's web site.

Alternatively, this map may reflect real-time service availability using recently collected service reports, such as over the last 15 minutes. Such a map can be distributed through electronic means such as offering the map online via a map resource web site or through a wireless service provider's web site, or even broadcast in real-time using television, podcasting, wireless web, streaming video, and the like.

Suitable Computing Platform

In one embodiment, the functionality of plan optimization invention, including the previously described logical processes, is performed in part or wholly by software executed by a computer, such as an embedded microcontroller, a personal computer, a web server, a web browser, or even an appropriately capable portable computing platform, such as personal digital assistant ("PDA"), web-enabled wireless telephone, or other type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
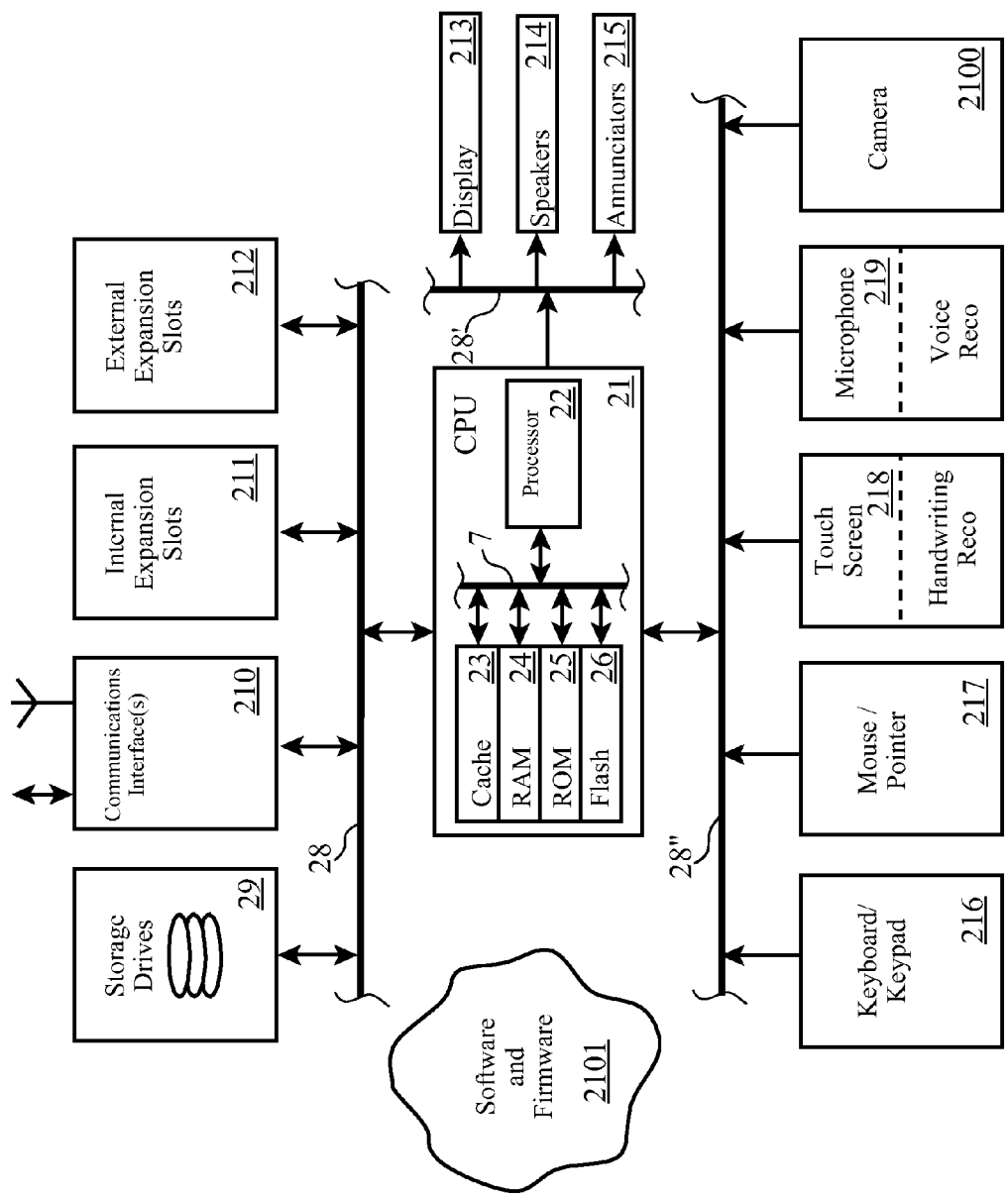
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
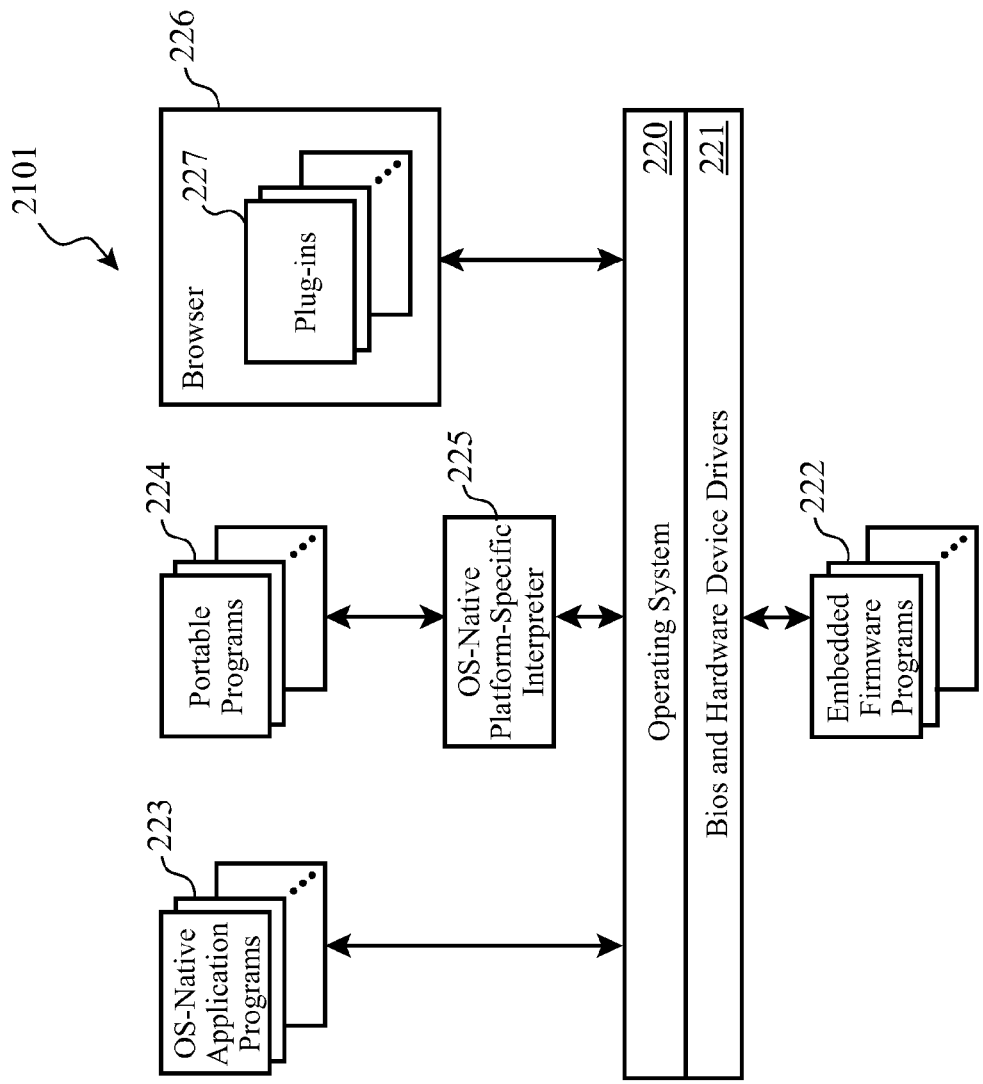

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms including, but not limited to, personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include some or all of the foregoing logical processes and functions of the invention being provided by configuring software, deploying software, downloading software, distributing software, or remotely serving clients in an on-demand environment, to provide the logical control processes of the plan optimizer.

Software Deployment Embodiment. According to one embodiment of the invention, the methods and processes of the invention are distributed or deployed as a service by a service provider to a client's computing system(s).

Figure 3A:
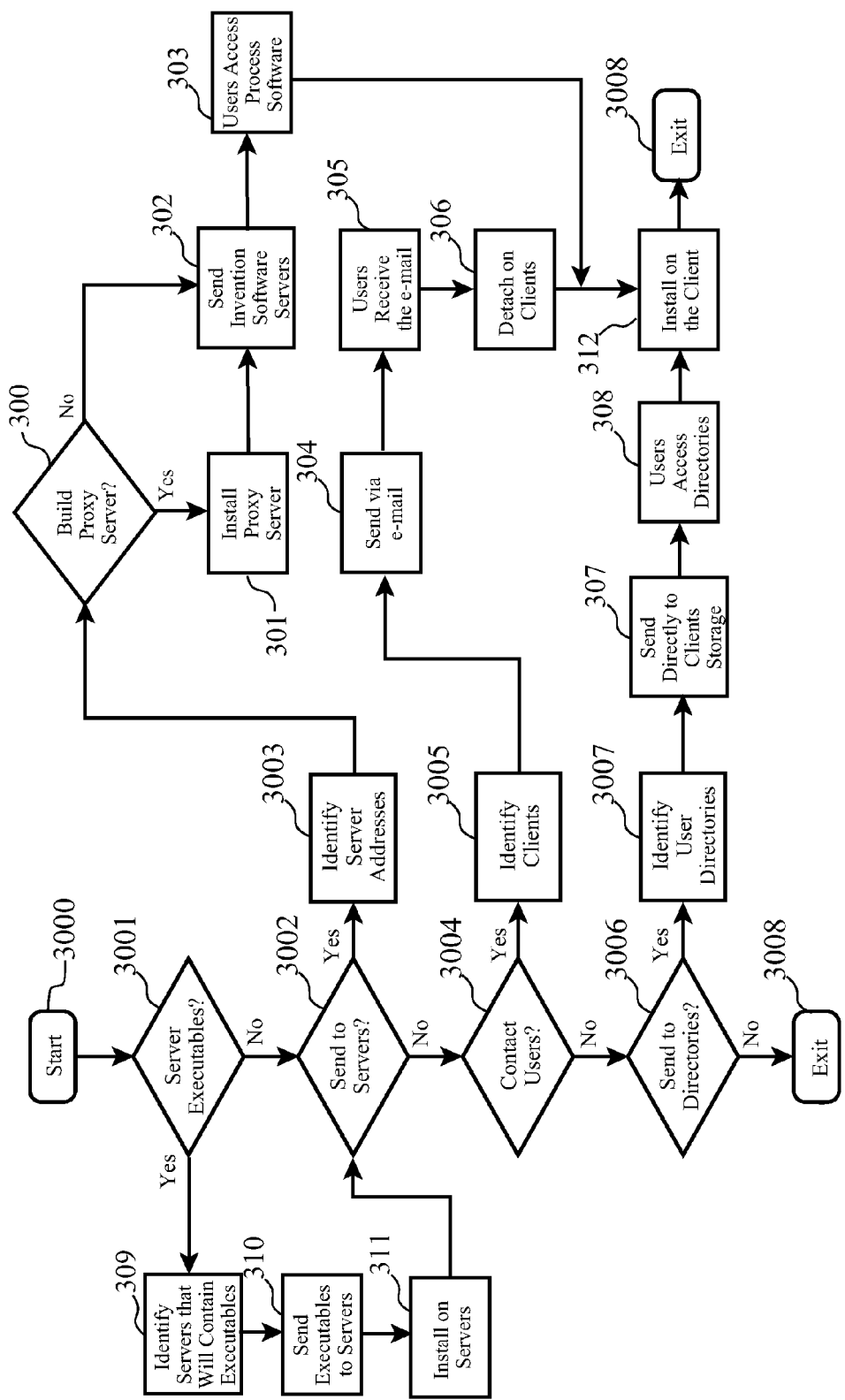
FIG. 3a sets forth a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
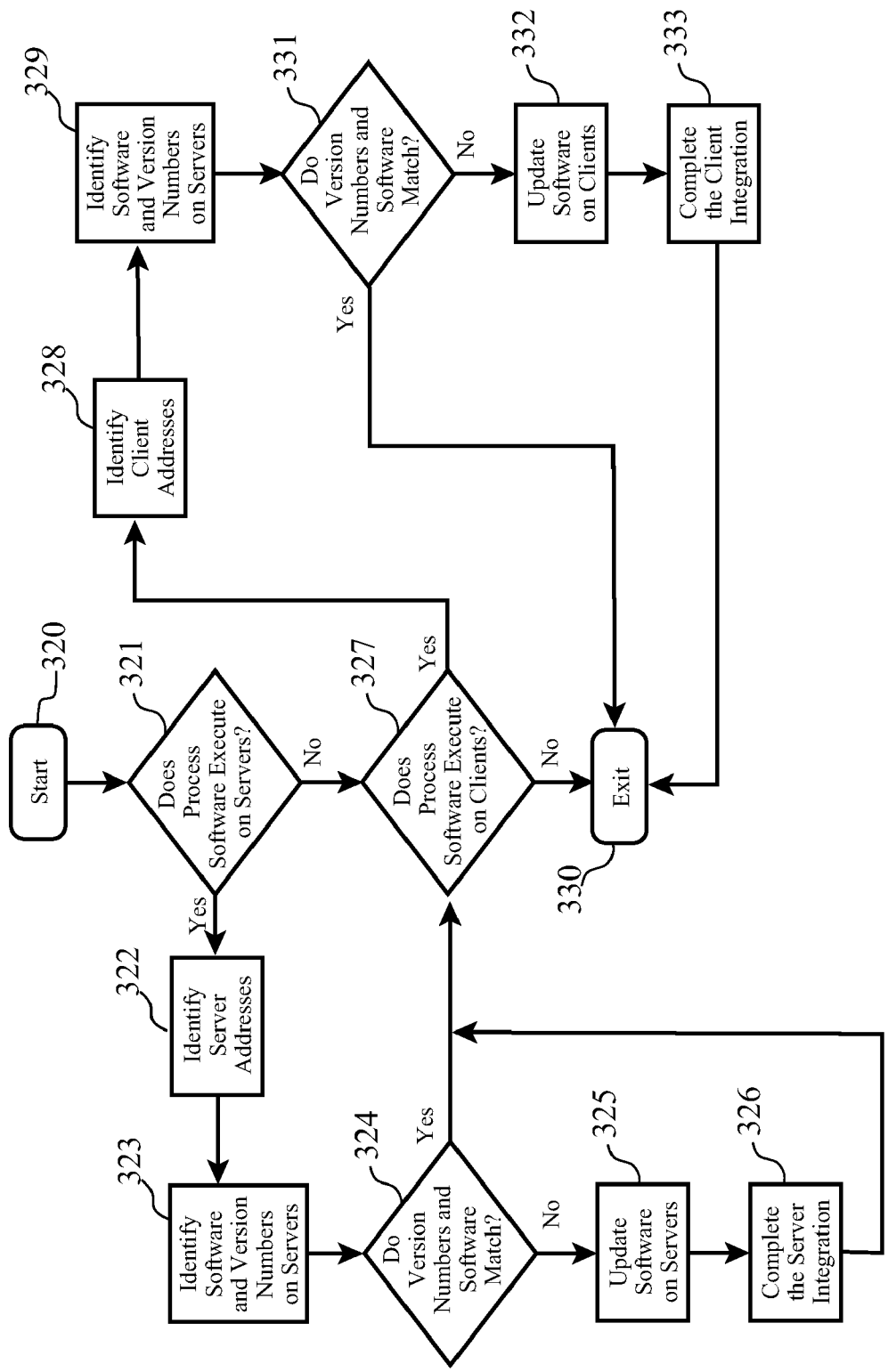
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

On-demand Computing Services Embodiment. According to another aspect of the present invention, the processes and methods disclosed herein are provided through an on-demand computing architecture to render service to a client by a service provider.

Figure 3C:
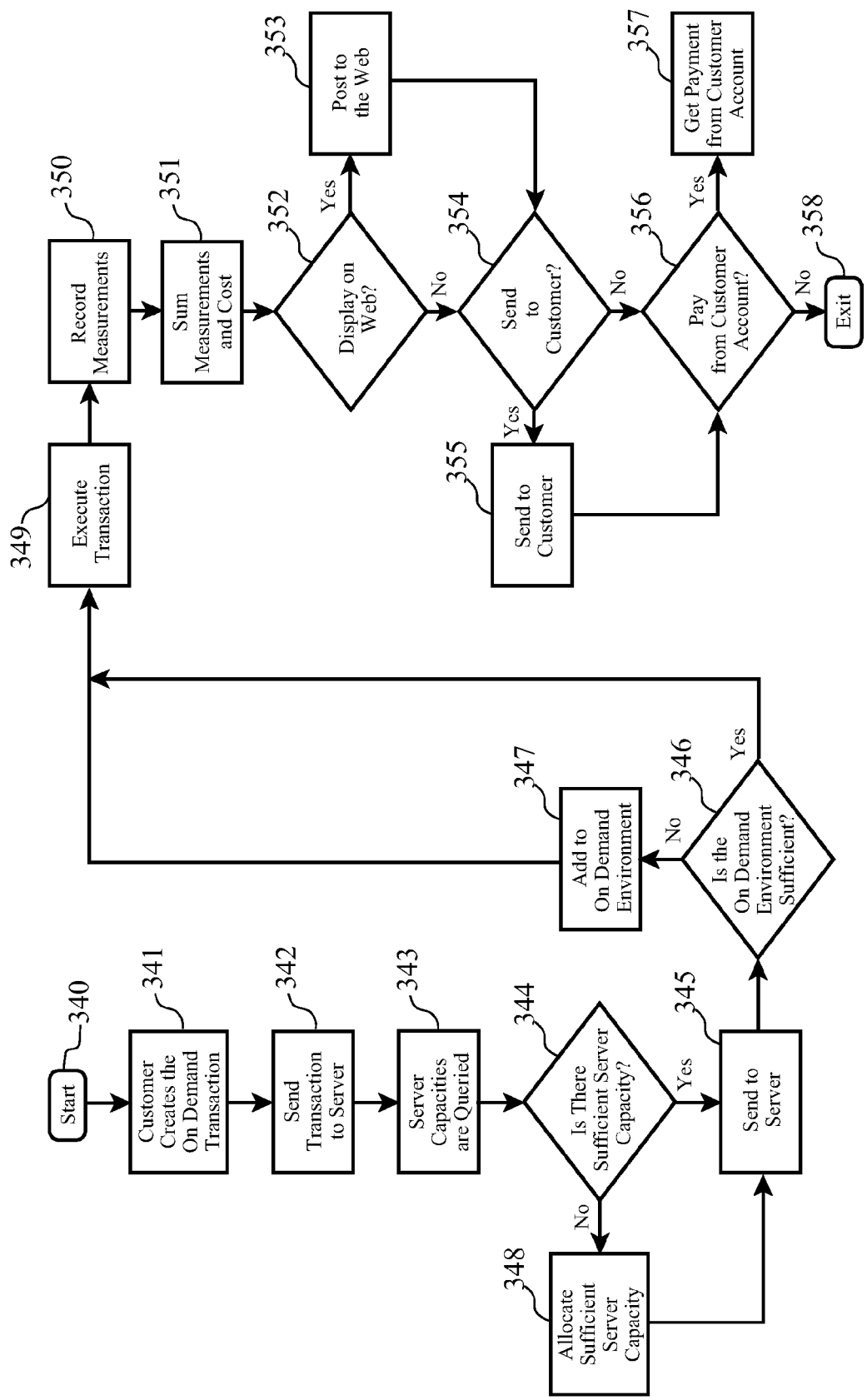
FIG. 3c sets for a logical process to execute software on behalf of a client in an on-demand computing system, in which the executed software embodies the methods and processes of the present invention.

Turning to FIG. 3*c*, generally speaking, the process software embodying the methods disclosed herein is shared, simultaneously serving multiple customers in a flexible, automated fashion. It is standardized, requiring little customization and it is scalable, providing capacity on-demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3*c* sets forth a detailed logical process which makes the present invention available to a client through an on-demand process. A transaction is created that contains the unique customer identification, the requested service type and any service parameters that further specify the type of service (341). The transaction is then sent to the main server (342). In an on-demand environment the main server can initially be the only server, then as capacity is consumed other servers are added to the on-demand environment.

The server central processing unit ("CPU") capacities in the on-demand environment are queried (343). The CPU requirement of the transaction is estimated, then the servers available CPU capacity in the on-demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity then the transaction is sent to a selected server (345).

Before executing the transaction, a check is made of the remaining on-demand environment to determine if the environment has sufficient available capacity for processing the transaction. This environment capacity consists of such things as, but not limited to, network bandwidth, processor memory, storage etc. (345). If there is not sufficient available capacity, then capacity will be added to the on-demand environment (347). Next the required software to process the transaction is accessed, loaded into memory, then the transaction is executed (349).

The usage measurements are recorded (350). The usage measurements consists of the portions of those functions in the on-demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the on-demand costs be posted to a web site (352) then they are posted (353). If the customer has requested that the on-demand costs be sent via e-mail to a customer address (354) then they are sent (355). If the customer has requested that the on-demand costs be paid directly from a customer account (356) then payment is received directly from the customer account (357). The last step is to exit the on-demand process.

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is built on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
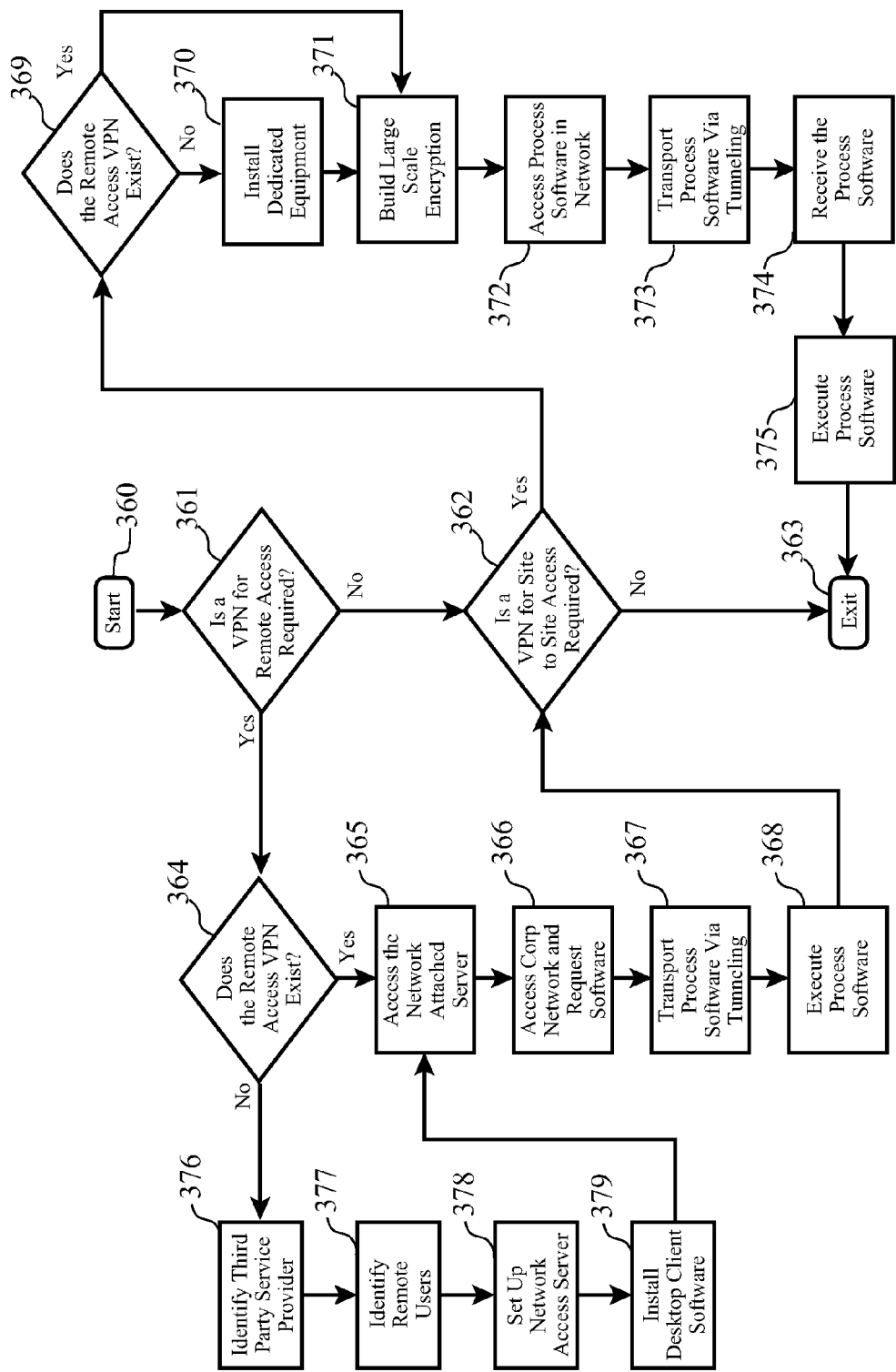
FIG. 3d sets for a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site-to-site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention for and described herein for optimizing an electronic agenda, itinerary, route plan, or calendar, are encoded on or in one or more computer-readable media. Some computer-readable media are read-only (e.g. they must be initially programmed using a different device than that which is ultimately used to read the data from the media), some are write-only (e.g. from a the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
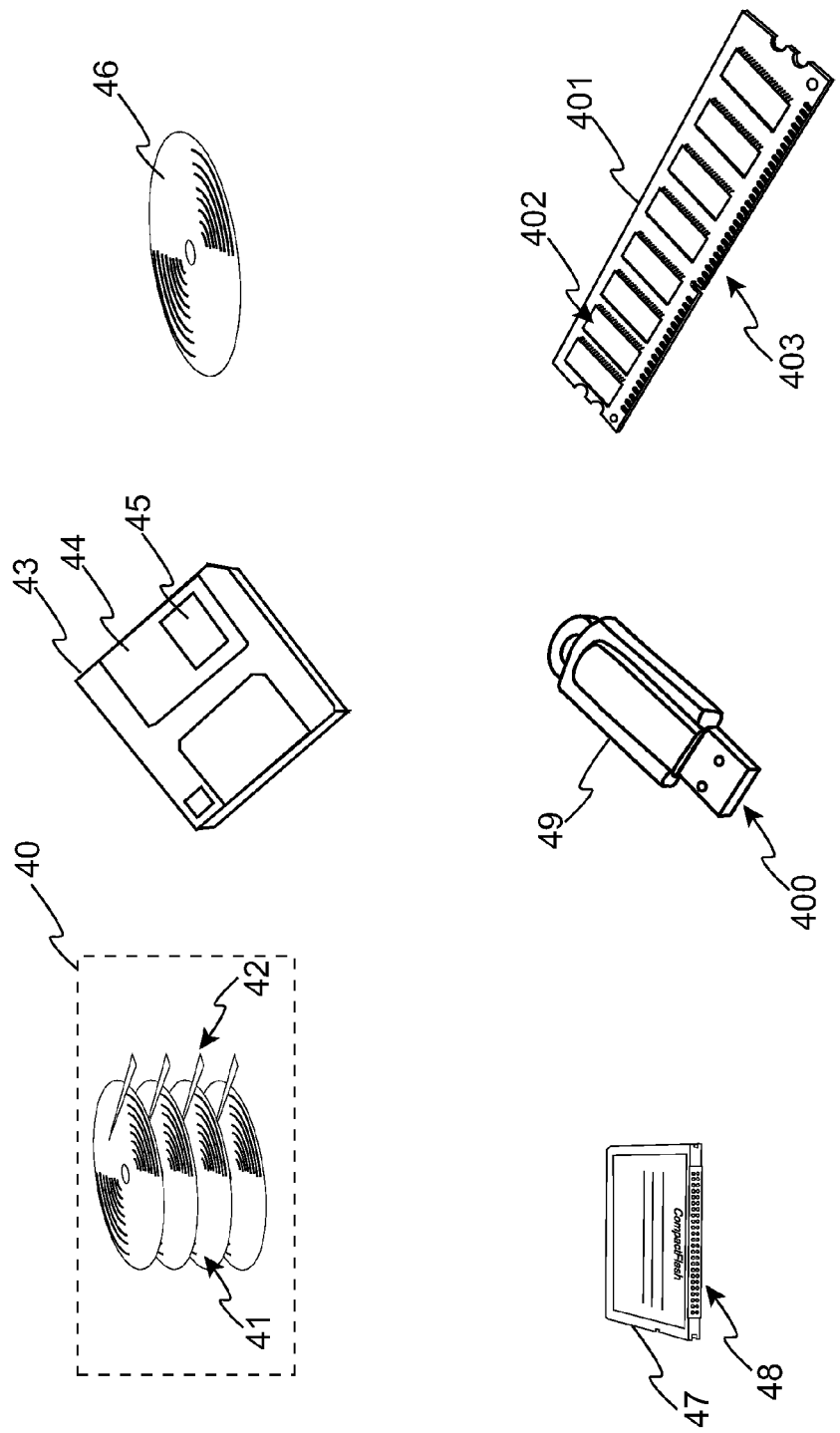
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliablity and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
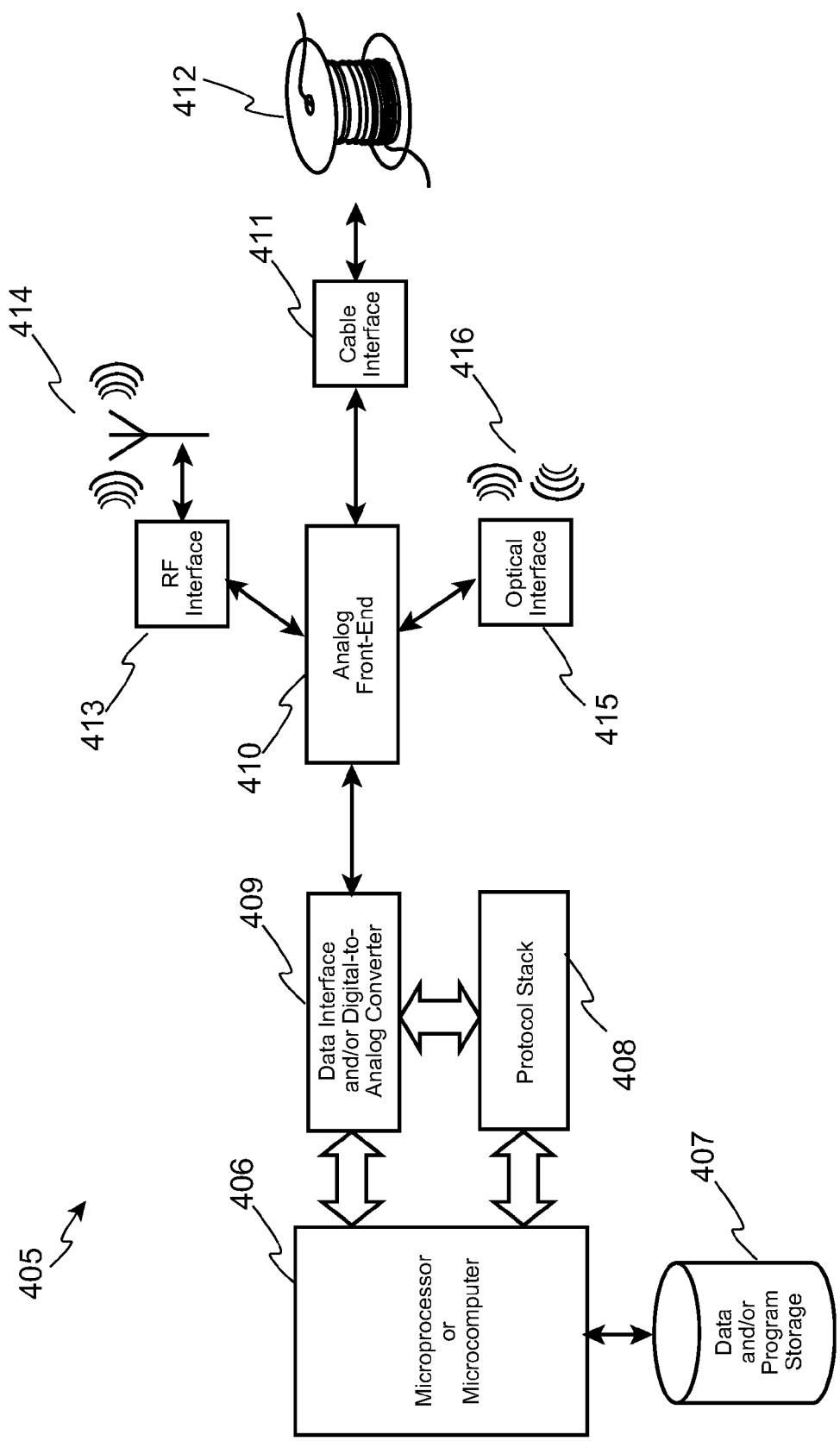

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage memory for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "Firewire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such a RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
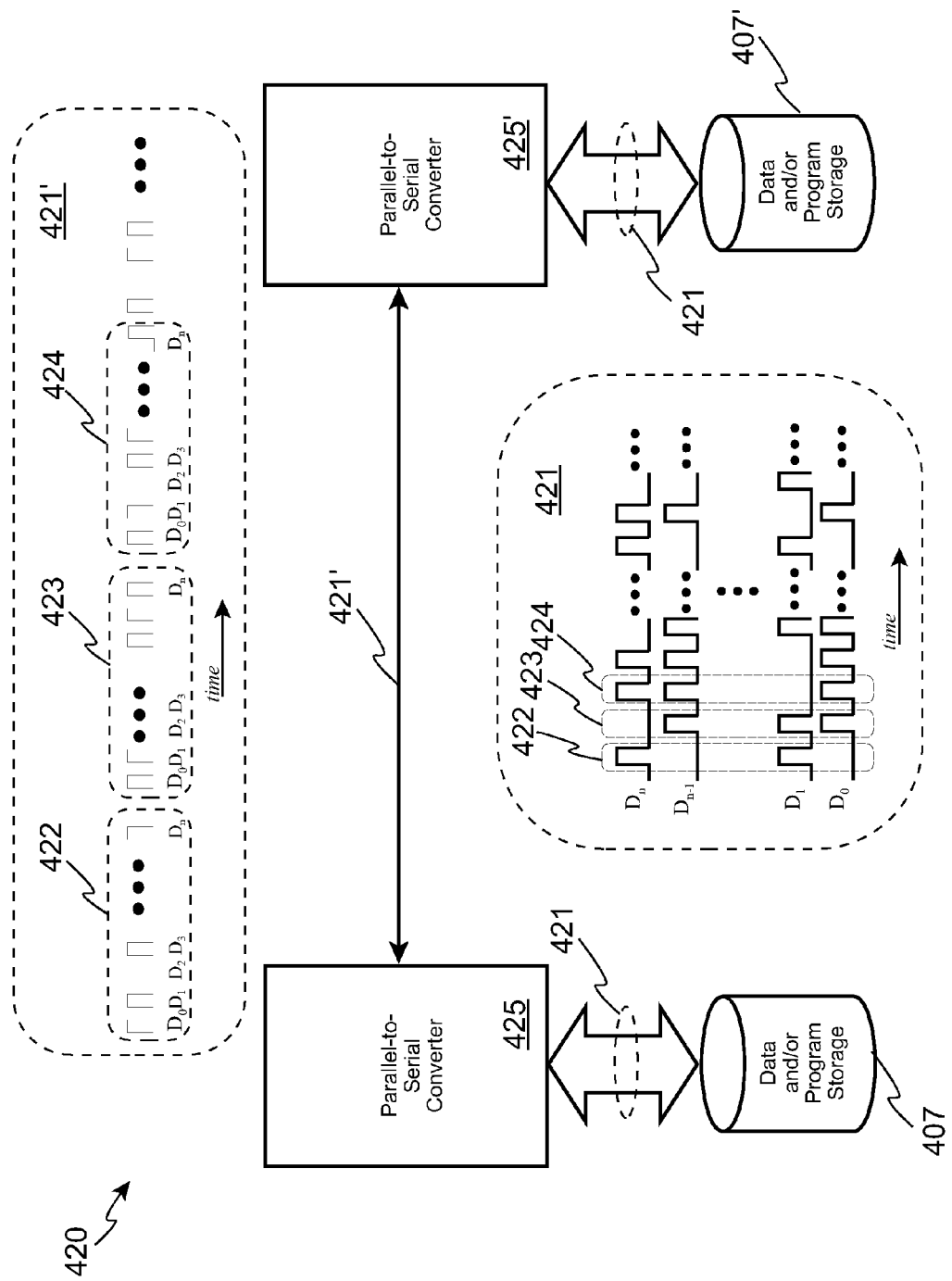

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n-1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer storage memory (407,407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as a RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of various embodiments have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A system comprising:
a computing platform having a means for performing a logical process;
a first input portion of the computing platform receiving an electronic plan for a first user, having one or more service need indications that wireless connectivity is required during at least one event of the plan;
a second input portion of the computing platform receiving electronic reports from a plurality of devices operated by one or more users other than the first user, the reports indicating actual historical availability conditions of the required wireless connectivity at a location associated with the event of the plan;
a plan modifier portion of the computing platform analyzing the received electronic historical reports of connectivity, finding an alternate time, location, route, or combination of time, location, and route, for an event responsive to determining that the required connectivity would not likely meet a service quality preference, and modifying the electronic personal plan to reflect the alternate finding to the user; and
a user interface portion of the computing platform causing the modified electronic personal plan to be communicated to the user.

2. The system as set forth in claim 1 wherein the first input is configured to receive an electronic agenda from a user.

3. The system as set forth in claim 1 wherein the first input is configured to receive an electronic itinerary from a user.

4. The system as set forth in claim 1 wherein the first input is configured to receive an electronic calendar from a user.

5. The system as set forth in claim 1 wherein the first input is configured to receive an electronic route plan from a user.

6. The system as set forth in claim 1 wherein the modified electronic personal plan comprises a map having one or more service availability icons reflecting said received electronic reports regarding wireless connectivity availability.

7. The system as set forth in claim 1 wherein the actual availability conditions comprise a signal strength measurement collected from a wireless service consumption device.

8. The system as set forth in claim 1 wherein the actual availability conditions comprise a data throughput measurement collected from a wireless service consumption device.

9. The system as set forth in claim 1 wherein the actual availability conditions comprise a channel availability measurement collected from a wireless service consumption device.

10. The system as set forth in claim 1 wherein the actual availability conditions comprise a service security qualifier collected from a wireless service consumption device.

11. The system as set forth in claim 1 wherein said modified electronic personal plan comprises a voice message.

12. The system as set forth in claim 1 wherein said modified electronic personal plan comprises a text message.

13. The system as set forth in claim 1 wherein said modified electronic personal plan comprises a navigation system instruction.

14. An automated method comprising:
receiving an electronic personal plan for a first user, having one or more service need indications that a wireless connectivity is required during at least one event of the plan;
receiving one or more electronic reports from devices operated by one or more users other than the first user, the electronic reports indicating actual historical availability conditions of the required wireless connectivity at a location associated with the event of the plan;
analyzing the received electronic historical reports to find an alternate time, location, route, or combination of time, location, and route, for an event responsive to determining the needed wireless connectivity would not likely meet a service quality preference according to the historical availability;
modifying the electronic personal plan to reflect the alternate finding to the first user; and
transmitting a communique to said first user containing said alternate findings.

15. The method as set forth in claim 14 wherein the plan comprises an electronic plan selected from the group of an electronic agenda, an electronic itinerary, an electronic calendar, and an electronic route plan.

16. The method set forth claim 14 wherein the communique comprises a communication selected from the group of a voice message, a text message, and email, a web page, and an instruction in a navigational system.

17. The method as set forth in claim 14 wherein the actual availability conditions comprise at least one condition selected from the group of a signal strength measurement collected from a wireless service consumption device, a data throughput measurement collected from a wireless service consumption device, a channel availability measurement collected from a wireless service consumption device, and a service security qualifier collected from a wireless service consumption device.

18. The method as set forth in claim 14 wherein the step of modifying the plan comprises annotating an electronic map to produce a map having one or more service availability icons reflecting said received reports.

19. A computer readable storage memory comprising:
a computer-readable storage memory suitable for storing computer-executable code;
computer-executable code stored in the storage memory configured to cause a computer to:
receive an electronic personal plan for a first user having one or more service need indications that a wireless connectivity is required during at least one event of the plan;
receive one or more electronic reports from devices operated by one or more users other than the first user, the electronic reports indicating actual historical availability conditions of the required wireless connectivity at a location associated with the event of the plan;
analyze the received electronic historical reports to find an alternate time, location, route, or combination of time, location, and route, for an event responsive to determining the needed wireless connectivity would not likely meet a service quality preference according to the historical availability;
modify the electronic personal plan to reflect the alternate finding to the first user; and
transmit a communique to said first user containing said alternate findings.

20. The computer readable storage memory as set forth in claim 19 wherein the plan comprises an electronic plan selected from the group of an electronic agenda, an electronic itinerary, an electronic calendar, an electronic route plan, and a map.

* * * * *